(12) United States Patent
Abe et al.

(10) Patent No.: US 9,348,954 B2
(45) Date of Patent: May 24, 2016

(54) NON-TRANSITORY, COMPUTER READABLE STORAGE MEDIUM, METHOD OF CONTROLLING ANALYTICAL SUPPORT DEVICE, AND ANALYTICAL SUPPORT DEVICE

(75) Inventors: Hideki Abe, Isehara (JP); Sachio Kobayashi, Sagamihara (JP); Hiroki Kobayashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1030 days.

(21) Appl. No.: 13/483,485

(22) Filed: May 30, 2012

(65) Prior Publication Data

US 2012/0310605 A1 Dec. 6, 2012

(30) Foreign Application Priority Data

Jun. 2, 2011 (JP) .................................. 2011-124614

(51) Int. Cl.
*G06F 17/50* (2006.01)

(52) U.S. Cl.
CPC ........ *G06F 17/5018* (2013.01); *G06F 2217/82* (2013.01)

(58) Field of Classification Search
CPC .......................... G06F 17/5018; G06F 2217/82
USPC .................... 703/1; 700/97–98; 345/419–420
See application file for complete search history.

(56) References Cited

U.S. PATENT DOCUMENTS

| 5,644,687 | A | * | 7/1997 | Agonafer et al. | ............. 345/419 |
| 7,620,528 | B2 | * | 11/2009 | Kato et al. | ....................... 703/2 |
| 2005/0073519 | A1 | * | 4/2005 | Onodera et al. | ............. 345/420 |
| 2009/0271156 | A1 | * | 10/2009 | Kageura | .......................... 703/1 |
| 2012/0069011 | A1 | * | 3/2012 | Hurt et al. | ..................... 345/419 |

FOREIGN PATENT DOCUMENTS

| JP | 2003-075248 | 3/2003 |
| JP | 2009-162684 | 7/2009 |

* cited by examiner

*Primary Examiner* — Eunhee Kim
(74) *Attorney, Agent, or Firm* — Staas & Halsey LLP

(57) ABSTRACT

A non-transitory, computer readable storage medium storing a program that causes a computer to conduct a processing, the processing has creating a solid figure surrounding an object and a solid figure surrounding a plurality of components of a group of components included in the object, based on design information related to the object, determining elements belonging to the solid figure surrounding the plurality of components from a plurality of elements partitioned and divided from the created solid figure surrounding the object, generating a spatial model that represents a space in which the plurality of components exist, based on the determined elements that belong to the solid figure surrounding the plurality of components, and outputting a result of the generating.

17 Claims, 22 Drawing Sheets

NON-TRANSITORY, COMPUTER READABLE STORAGE MEDIUM, METHOD OF CONTROLLING ANALYTICAL SUPPORT DEVICE, AND ANALYTICAL SUPPORT DEVICE

CROSS-REFERENCE TO RELATED APPLICATION

This application is based upon and claims the benefit of priority of the prior Japanese Patent Application No. 2011-124614, filed on Jun. 2, 2011, the entire contents of which are incorporated herein by reference.

FIELD

An aspect of the present embodiment relates to an analytical support program, an analytical support method, and an analytical support device that support analyses.

BACKGROUND

Conventionally, acoustic analysis methods use Statistical Energy Analysis (SEA) methods in industrial product design processes to estimate acoustic vibration of high frequency regions transmitted inside manufactured products.

Acoustic analysis using the SEA method makes models of objects such as servers and the like. The modeling of an object is conducted by, for example, dividing an object having acoustic spaces into several subsystems to build networks between the subsystems indicating a coupling of acoustic vibration energies of each of the divided subsystems.

Related art includes, for example, directly coupling at least a subsystem input point and a subsystem response point to make a model in an acoustic vibration analytical method to evaluate acoustics and/or vibration (see, for example, Japanese Laid-open Patent Publication No. 2003-075248). Moreover, there is a technology to virtually divide a structure into a plurality of elements, measure energies of the elements by adding an input power, calculate a coupling loss factor and an internal loss factor to measure the energies of the elements when the structure is working, and identify the input powers (see, for example, Japanese Laid-open Patent Publication No. 2009-162684).

However, the related art leads to an increase in the working time to create an analytical model using the SEA method thus lengthening the analysis period for acoustic analysis. For example, the dividing work is complex for an inexperienced worker since experience and proficiency are desired to divide an object into subsystems. Even a worker who is experienced and proficient may take a large amount of time to create subsystem shapes if the object is large and complex.

SUMMARY

According to an aspect of the invention, a non-transitory, computer readable storage medium storing a program that causes a computer to conduct a processing, the processing has creating a solid figure surrounding an object and a solid figure surrounding a plurality of components of a group of components included in the object, based on design information related to the object, determining elements belonging to the solid figure surrounding the plurality of components from a plurality of elements partitioned and divided from the created solid figure surrounding the object, generating a spatial model that represents a space in which the plurality of components exist, based on the determined elements that belong to the solid figure surrounding the plurality of components, and outputting a result of the generating.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Detailed explanations of an embodiment of the analytical support program, the analytical support method, and the analytical support device concerning the present disclosure will be provided herein with reference to the accompanying drawings.

Figure 1:
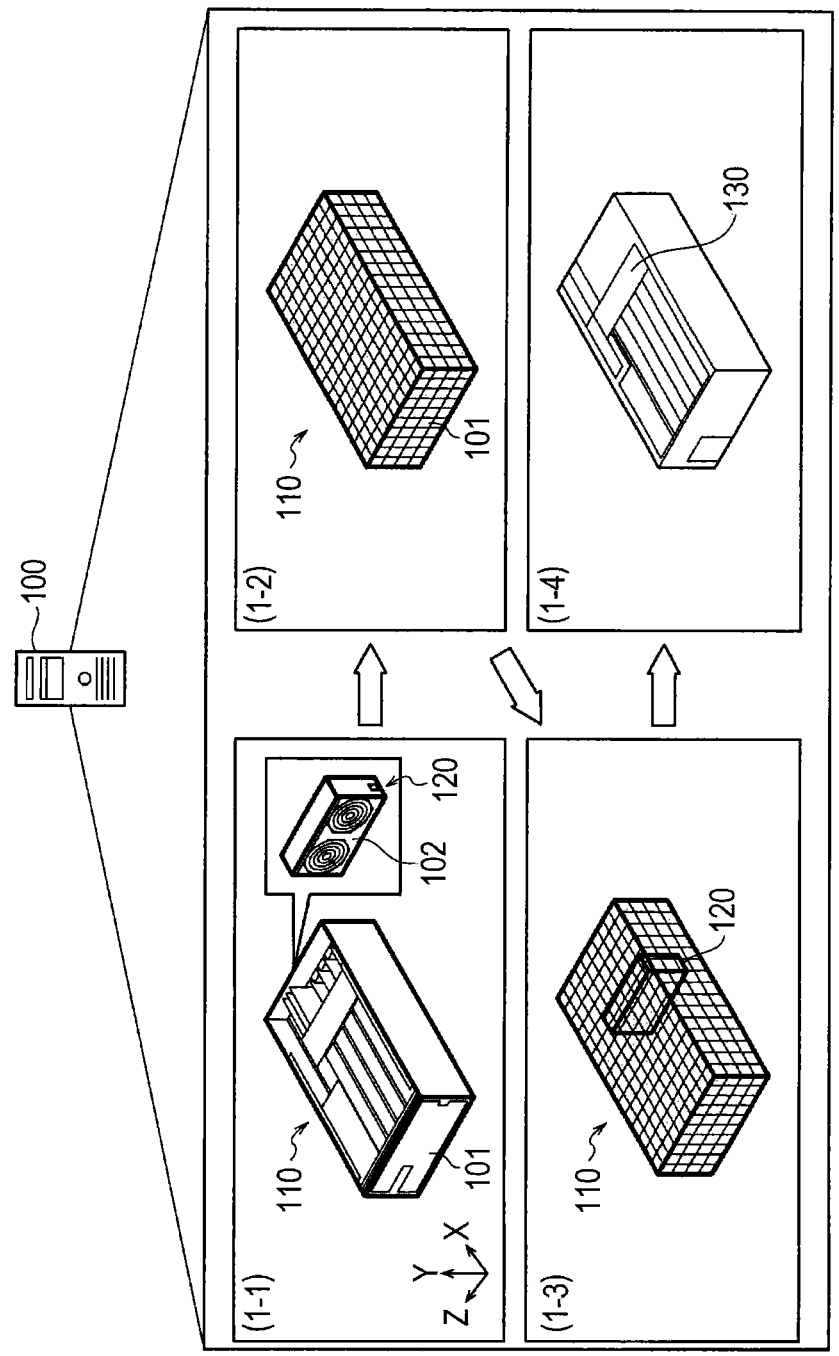
FIG. 1 illustrates an example of an analytical support according to an embodiment.

FIG. 1 describes an example of an analytical support method according to an embodiment. An analytical support device 100 illustrated in FIG. 1 is a computer that supports an analysis of an object. The analysis herein refers to acoustic vibration analysis using the SEA method for analyzing acoustics and vibration of a high frequency region transmitted inside an object. The object may be, for example, an electronic device, a manufacturing machine, a building, a vehicle, a boat, or an airplane.

Modeling of the object in the acoustic vibration analysis using the SEA method is conducted by dividing the object into several structures and then building a network between the structures to indicate the coupling of acoustic vibration energies. In acoustic vibration analysis, it is preferable to divide the object at locations where walls exist to appropriately analyze the dampening of sounds that collide with the walls inside the object and sounds that leak through holes in the walls.

Since there is a high possibility of walls being present at locations existing in components of the object in the present embodiment, structures are generated for each of the divided components at locations where the object has walls by anticipating and merging a plurality of elements divided from the entire object into spaces in which the components exist in the object.

The following is an explanation of one example of analytical support processing of the analytical support device 100 according to the embodiment. The explanation herein uses a server 101 as an example of the object of the acoustic vibration analysis.

(1-1) The analytical support device 100 creates a solid figure surrounding the object and solid figures surrounding a plurality of components of the components included in the object according to design information related to the object. The design information herein refers to three dimensional model data that indicates the shapes, materials, positions, and the like of the components that make up the object.

Moreover, a group of components is a collection of components included in the object such as, for example, a collection of components having fixed sizes among the components that make up the object. Examples of components include a central processing unit (CPU), a power source, a fan, and the like. The solid figure refers to, for example, a rectangular, circular, or polygonal figure that surrounds the object or a component. In FIG. 1, for example, a rectangular solid 110 that surrounds the server 101 (object) and a rectangular solid 120 that surrounds a fan 102 (component) are described in a Cartesian coordinate system made up of an x-axis, a y-axis, and a z-axis.

(1-2) The analytical support device 100 partitions a solid figure surrounding the object and divides the solid figure into a plurality of elements. The division intervals used here to divide the solid figure surrounding the object are set as a length (for example, 30 mm) that may contain sound wavelengths subject to the acoustic vibration analysis for example. In FIG. 1, the rectangular solid 110 surrounding the server 101 (object) is partitioned into a grid and divided into the plurality of elements.

(1-3) The analytical support device 100 determines elements belonging to the solid figure surrounding various components from the plurality of elements partitioned and divided from the solid figure surrounding the object. Specifically, the analytical support device 100 for example, sequentially selects rectangular solids with small volumes from the rectangular solids surrounding the various components to determine the elements belonging to those rectangular solids by searching for the elements included in those rectangular solids.

By doing so, rectangular solids to which the elements belong may be uniquely specified even when rectangular solids surrounding the various components overlap and a certain element is included in a plurality of rectangular solids.

As a result, for example, the group of elements belonging to the rectangular solid 120 surrounding the fan 102 (component) may be specified.

(1-4) The analytical support device 100 generates a spatial model that represents a space in which the various components exist according to the elements that belong to the solid figures that surround the various components. Herein, a spatial model is a model of a solid shape and represents a space in which sound waves exist (in other words, a sound field). Specifically, the analytical support device 100 for example generates a spatial model by merging elements belonging to rectangular solids that surround various components.

In FIG. 1, for example, a spatial model 130 is generated by merging the group of elements belonging to the rectangular solid 120. The spatial model 130 specifically is information that specifies the solid shape of the spatial model 130, and is, for example, information that specifies planes that form the spatial model 130 and apexes that make up those planes.

In this way, a group of elements belonging to the solid figure that surrounds various elements included in the object may be specified among the plurality of elements divided from the solid figure that surrounds the object by the analytical support device 100 according to the present embodiment. Moreover, the analytical support device 100 may generate a spatial model that represents a sound field in which various components exist based on the groups of elements that belong to the solid figures that surround the various components.

As a result, a spatial model that is divided by locations with a high probability of having walls and incorporating components included in the object may be generated, and thus efficiency may be improved in the work to create analytical models suited for acoustic vibration analysis using the SEA method. Additionally, material properties and the like that become analytical conditions in the acoustic vibration analysis may be easily set to spatial models since the spatial models correspond to various components, thus allowing for improvements in the efficiency of the work to create analytical models.

Figure 2:
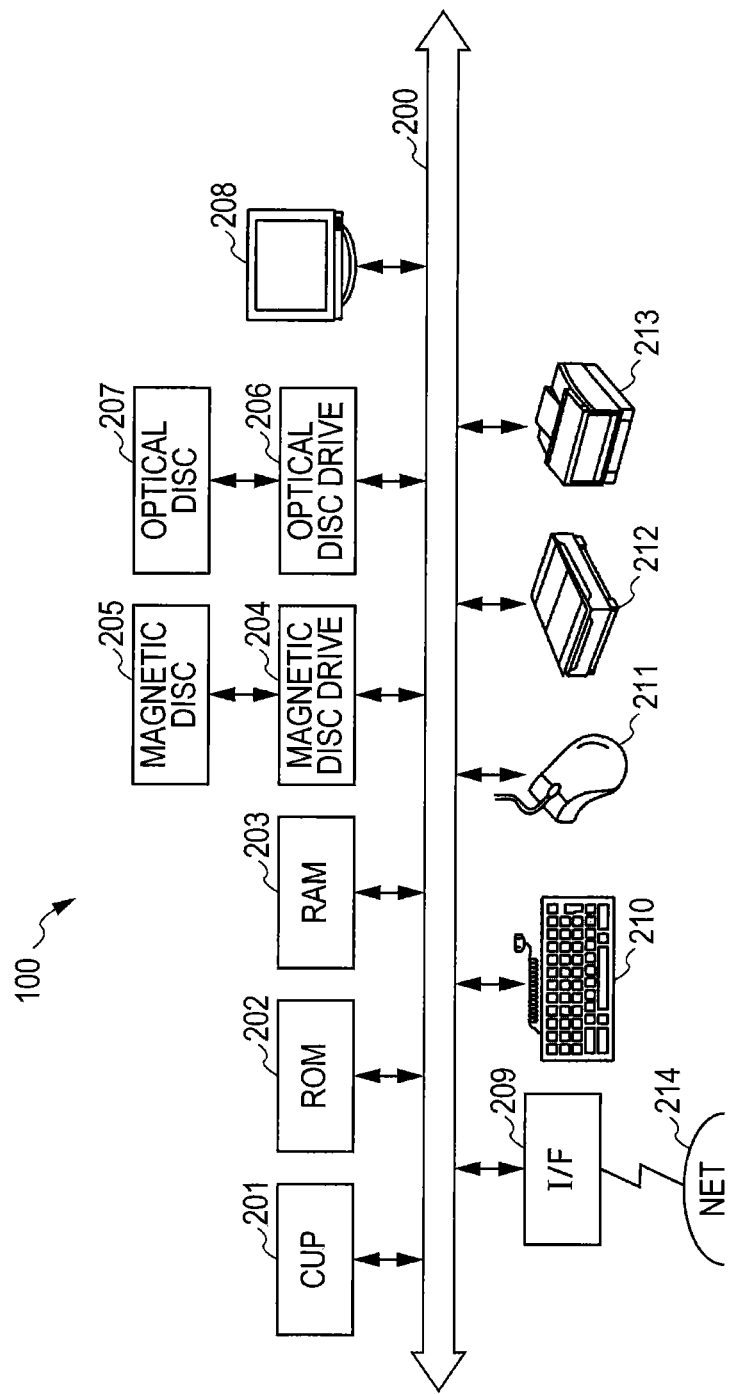
FIG. 2 is a block diagram of a hardware configuration of an analytical support device according to the embodiment.

FIG. 2 is a block diagram of a hardware configuration of the analytical support device 100 according to the embodiment. In FIG. 2, the analytical support device 100 includes a CPU 201, a Read-Only Memory (ROM) 202, a Random Access Memory (RAM) 203, a magnetic disc drive 204, a magnetic disc 205, an optical disc drive 206, an optical disc 207, a display 208, an interface (I/F) 209, a keyboard 201, a mouse 211, a scanner 212, and a printer 213. The various configured units are interconnected by a bus 200.

The CPU 201 oversees the control of the entire analytical support device 100. The ROM 202 stores programs such as a boot program and the like. The RAM 203 is used as a work area by the CPU 201. The magnetic disc drive 204 controls reading and writing of data on the magnetic disc 205 according to the control of the CPU 201. The magnetic disc 205 stores data written through the control of the magnetic disc drive 204.

The optical disc drive 206 controls reading and writing data on the optical disc 207 according to the control of the CPU 201. The optical disk 207 stores data written through the control of the optical disc drive 206 and is caused by a computer to read out data stored on the optical disc 207.

The display 208 displays cursors, icons, and tool boxes as well as data such as text, images, and function information and the like. For example, a CRT, a TFT liquid crystal display, or a plasma display and the like may be used as the display 208.

The I/F 209 is connected through a communication line to a network 214 such as a Local Area Network (LAN), a Wide Area Network (WAN) or the internet, and is connected to other devices via the network 214. The I/F 209 oversees an internal interface with the network 214 to control the input and output of data from external devices. For example, a modem or a LAN adapter and the like may be used as the I/F 209.

The keyboard 210 is equipped with keys for inputting characters, numbers, and various instructions and the like to conduct data input. Moreover, the keyboard 201 may include a touch panel type of input pad or numeric keys and the like. The mouse 211 conducts cursor movements and range selections, and also moves windows and changes window sizes. A device equipped with functions similar to a pointing device such as a track ball or a joystick may also be used.

The scanner 212 optically reads out images and loads the image data into the analytical support device 100. The scanner 212 may also have an Optical Character Reader (OCR) function. The printer 213 prints image and text data. For example, a laser printer or an ink-jet printer and the like may be used.

The analytical support device 100 may not necessarily include the optical disc drive 206, the optical disc 207, the display 208, the keyboard 210, the mouse 211, the scanner 212 and/or the printer 213 among the abovementioned configuration elements.

Figure 3:
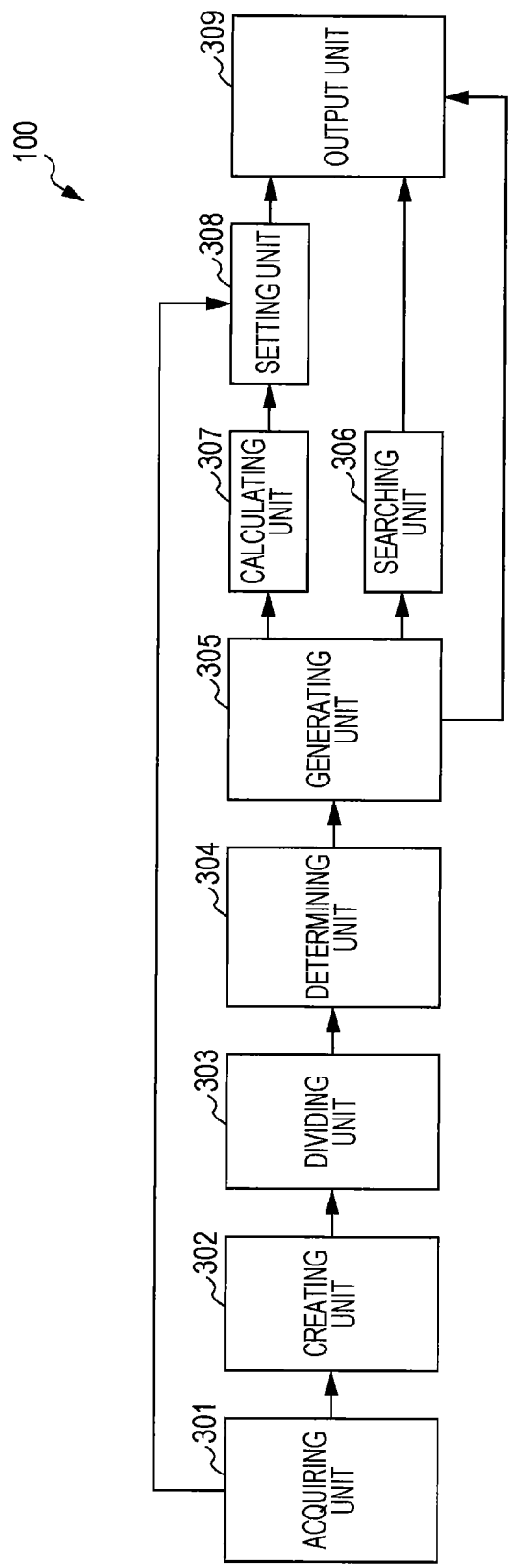
FIG. 3 is a block diagram of a functional configuration of the analytical support device according to the embodiment.

FIG. 3 is a block diagram of a functional configuration of the analytical support device 100 according to the embodiment. FIG. 3 illustrates a configuration of the analytical support device 100 including an acquiring unit 301, a creating unit 302, a dividing unit 303, a determining unit 304, a generating unit 305, a searching unit 306, a calculating unit 307, a setting unit 308, and an output unit 309. Specifically, the control unit of these functions (the acquiring unit 301 to the output unit 309) implements the functions using, for example, the I/F 209 or using programs executed by the CPU 201 and stored in a storage device such as the ROM 202, the RAM 203, the magnetic disc 205, and the optical disc 207 and the like illustrated in FIG. 2. Results of processing by the functional units are stored, for example, in a storage device such as the RAM 203, the magnetic disc 205, and/or the optical disc 207.

The acquiring unit 301 has a function to acquire design information related to an object. The design information herein refers to, for example, three dimensional model Computer Aided Design (CAD) data that includes shape data, material data, position data and the like of the components that make up the object. Shape data includes information that specifies a shape of a component for example. Material data includes, for example, information specifying the names, volumes, densities, and material properties such as Young's modulus of the materials (iron, air, and the like) included in the components. Position data includes information that specifies arrangement positions of the components in a 3-dimensional Cartesian coordinate system.

Specifically, the acquiring unit 301 acquires, for example, design information related to an object from an external computer via the network 214, or from inputs made by a user using the keyboard 201 and/or the mouse 211 illustrated in FIG. 2. The analytical support device 100 may also acquire two dimensional CAD data of an object and then convert the two-dimensional CAD data to three-dimensional CAD data.

The creating unit 302 has a function to create a solid figure surrounding the object and solid figures surrounding a plurality of components of the components included in the object according to design information related to the object. A solid figures that surrounds the object or a component herein is, for example, a smallest rectangular solid (hereinbelow called a "bounding box") that surrounds the object or a component in the 3-dimensional Cartesian coordinate system.

Specifically for example, the creating unit 302 first selects, from the object, an assembly that falls within a specific range (for example, 3% to 30%) of a volume in relation to the volume of the entire object. The assembly refers to a combination of one or more components. A combination of components that make up an assembly may be specified from assembly tree information for example.

Assembly tree information is information that represents a hierarchical structuring of component groups that make up the object. The assembly tree information includes, for example, information that indicates the volume of each assembly. The volume of each assembly may also be derived by adding up the volumes of the components that make up each assembly.

The assembly tree information may be included in, for example, the design information related to the object, and acquired along with the design information. Moreover, the above specific range may be, for example, freely setted and is stored in a storage device such as the ROM 202, the RAM 203, the magnetic disc 205, and/or the optical disc 207.

More specifically, the creating unit 302, for example, refers to the assembly tree information to select an assembly in a specific range of a volume in relation to the volume of the entire object. The creating unit 302 may also select from the object an assembly instructed through the manual input of a user.

The creating unit 302 then creates a bounding box surrounding the object in the Cartesian coordinate system made up of x, y, and z axes. The creating unit 302 then creates bounding boxes surrounding the selected assemblies in the Cartesian coordinate system made up of x, y, and z axes. The bounding boxes are created so that the sides of the bounding boxes are parallel to any of the x, y, or z axes.

Hereinbelow, a group of assemblies selected from the object are described as assemblies Ab1 to Abn. Moreover, the bounding box that surrounds the object is described as bounding box B0, and the bounding boxes that surround the assemblies Ab1 to Abn are described as bounding boxes B1 to Bn.

Figure 4:
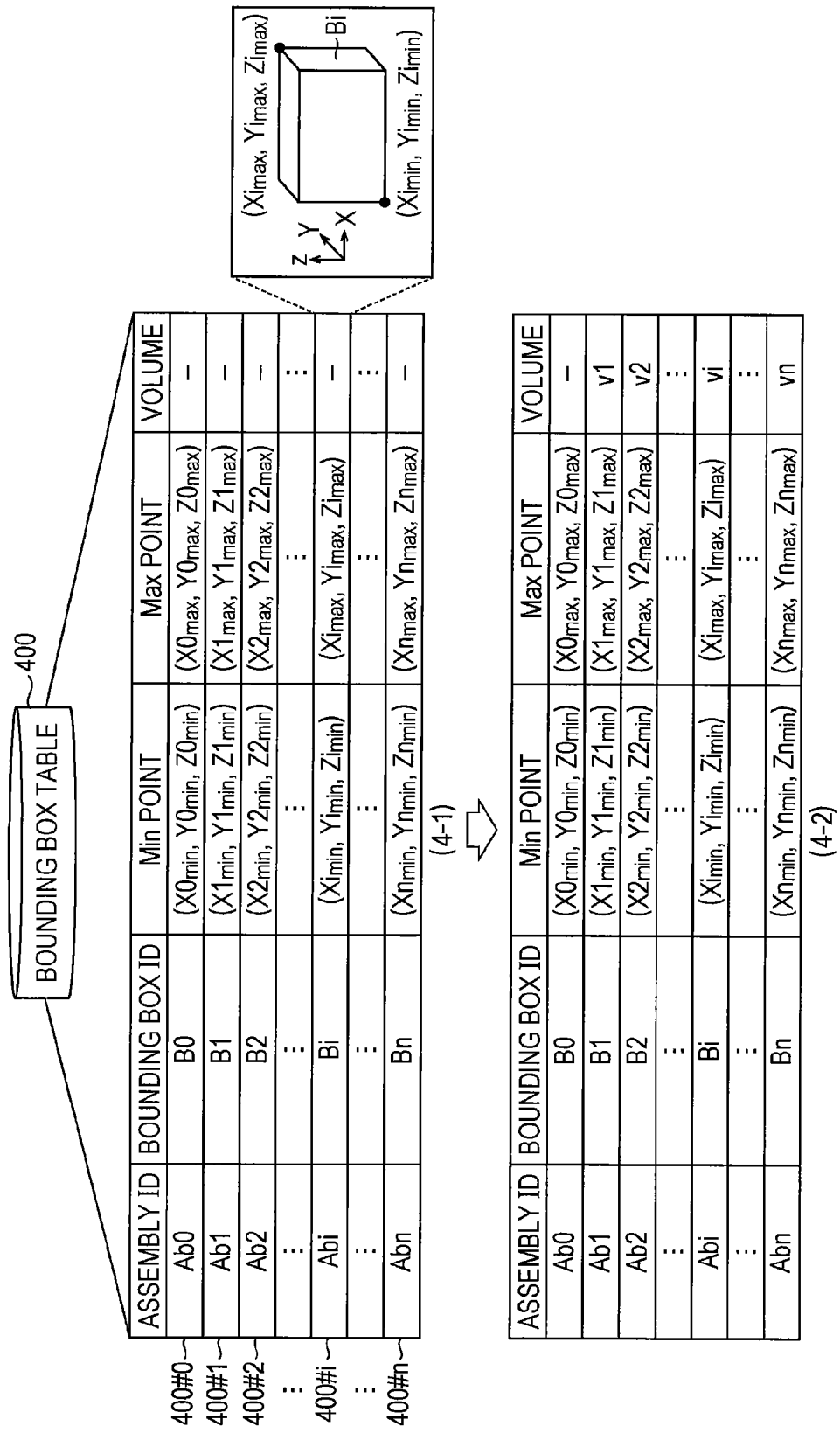
FIG. 4 illustrates an example of stored contents of a bounding box table.

Created results are stored in, for example, a bounding box table 400 illustrated in FIG. 4. The bounding box table 400 is realized, for example, by a storage device such as the RAM 203, the magnetic disc 205, and/or the optical disc 207. The following describes the stored contents of the bounding box table 400.

FIG. 4 describes an example of stored contents of a bounding box table 400. In FIG. 4, the bounding box table 400 includes fields for an assembly ID, a bounding box ID, a Min point, a Max point, and a volume. By setting information in each field, bounding box information 400-#0 to 400-#n is stored as records.

The assembly ID is an identifier of an assembly. The assembly ID "Ab0" indicates the object. The bounding box ID is a bounding box identifier. The Min point indicates the smallest points of the x, y, and z coordinates among apexes of the bounding box in the Cartesian coordinate system made up of x, y, and z axes.

The Max point indicates the largest points of the x, y, and z coordinates among apexes of the bounding box in the Cartesian coordinate system made up of x, y, and z axes. The volume refers to the volume of the bounding box. The volumes of the bounding boxes B0 to Bn are indicated as "-" (null) in an initial state.

Using bounding box information 400-#i in (4-1) in FIG. 4 as an example, the Min points of the bounding box Bi surrounding the assembly Abi are indicated as ($Xi_{min}$, $Yi_{min}$, $Zi_{min}$), and the Max points are indicated as ($Xi_{max}$, $Yi_{max}$, $Zi_{max}$).

Returning to the description of FIG. 3, the dividing unit 303 has a function of partitioning the bounding box B0 that surrounds the object and dividing the bounding box B0 into a plurality of elements. Specifically, the dividing unit 303 for example partitions the bounding box B0 into a grid pattern to form the plurality of elements from flat surfaces that include the planes of the bounding box Bi (where i=0, 1, 2, . . . , n).

The dividing unit 303 may also specify adjacency relationships between the elements divided from the bounding box B0 in the Cartesian coordinate system made up of the x, y, and z axes. An example of dividing the bounding box B0 is described below with reference to FIG. 10.

The plurality of elements divided from the bounding box B0 are described herein as elements C1 to Cm. Moreover, an arbitrary element among the elements C1 to Cm is referred to as element Cj (where j=1, 2, . . . , m).

Figure 5:
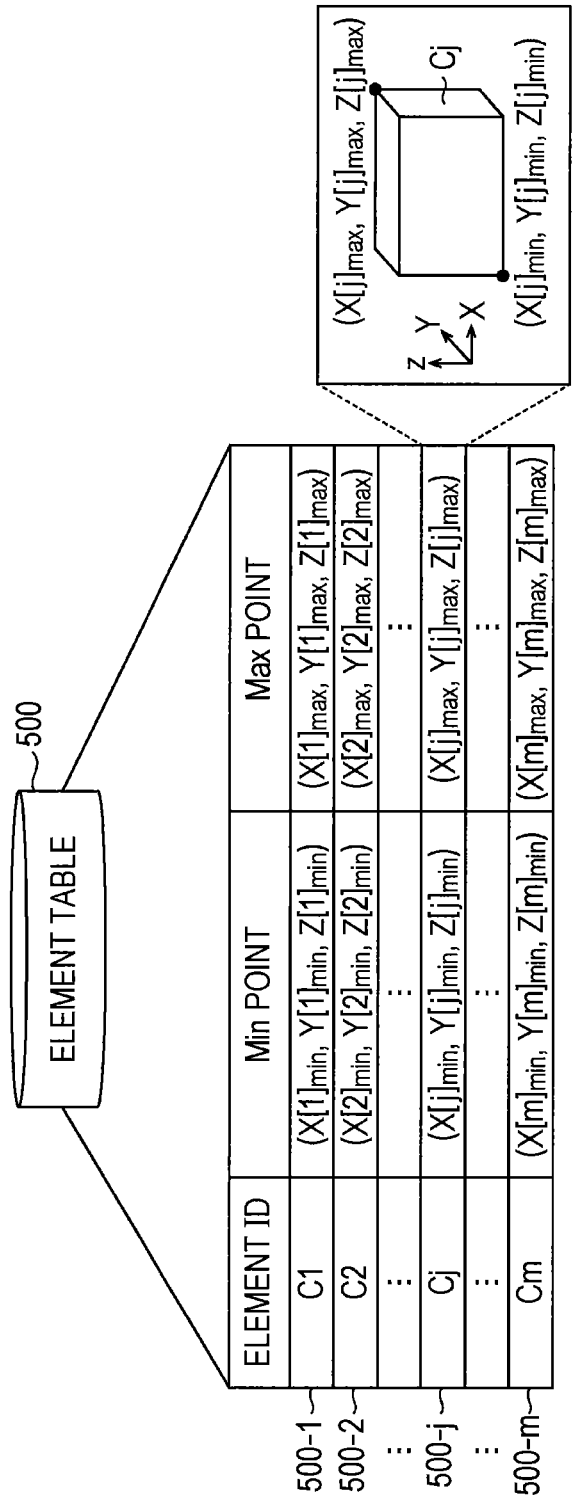
FIG. 5 illustrates an example of stored contents of an element table.

The division results are stored, for example, in an element table 500 illustrated in FIG. 5. The element table 500 is implemented, for example, by a storage device such as the RAM 203, the magnetic disc 205, and/or the optical disc 207. The following is a description of the contents stored in the element table 500.

FIG. 5 describes an example of stored contents of the element table 500. In FIG. 5, the element table 500 includes fields for an element ID, a Min point, and a Max point. By setting information in each field, element information 500-1 to 500-$m$ is stored as records.

The element ID is an identifier of an element divided from the bounding box B0. The Min point indicates the smallest points of the x, y, and z coordinates among apexes of the elements in the Cartesian coordinate system made up of x, y, and z axes. The Max point indicates the largest points of the x, y, and z coordinates among apexes of the elements in the Cartesian coordinate system made up of x, y, and z axes.

Looking at an example of the element information 500-$j$, Min points ($X[j]_{min}$, $Y[j]_{min}$, $Z[j]_{min}$) and Max points ($X[j]_{max}$, $Y[j]_{max}$, $Z[j]_{max}$) of an element Cj are indicated.

Returning to the description of FIG. 3, the determining unit 304 has a function to determine elements belonging to the bounding box Bi from the divided elements C1 to Cm. Specifically, the determining unit 304 first calculates, for example, volumes v1 to vn of the bounding boxes B1 to Bn.

The volumes v1 to vn may be calculated, for example, from the Min points and the Max points of the bounding boxes B1 to Bn in the bounding box table 400. The calculated volumes v1 to vn of the bounding boxes B1 to Bn are stored, for example, in the bounding box table 400 (see FIG. 4 (4-2)).

Next, the determining unit 304 selects the bounding box Bi with the smallest volume from the bounding boxes B1 to Bn. The determining unit 304 then determines whether or not an element Cj belongs to a bounding box Bi using the following formulas (1) to (3).

The $Xi_{min}$, $Yi_{min}$, and $Zi_{min}$ respectively represent the Min point x, y, and z coordinates of the bounding box Bi. The $Xi_{max}$, $Yi_{max}$, and $Zi_{max}$ respectively represent the Max point x, y, and z coordinates of the bounding box Bi. The $X[j]_{min}$, $Y[j]_{min}$, and $Z[j]_{min}$ respectively represent the Min point x, y, and z coordinates of the element Cj. The $X[j]_{max}$, $Y[j]_{max}$, and $Z[j]_{max}$ respectively represent the Max point x, y, and z coordinates of the element Cj.

$$Xi_{max} < X[j]_{max}, \text{ or } Xi_{min} > X[j]_{min} \quad (1)$$

$$Yi_{max} < Y[j]_{max}, \text{ or } Yi_{min} > Y[j]_{min} \quad (2)$$

$$Zi_{max} < Z[j]_{max}, \text{ or } Zi_{min} > Z[j]_{min} \quad (3)$$

The determining unit 304 determines that an element Cj belongs to the bounding box Bi if all the above formulas (1) to (3) are not satisfied. Conversely, the determining unit 304 determines that the element Cj does not belong to the bounding box Bi if at least any one of the above formulas (1) to (3) is satisfied.

The $Xi_{min}$, $Yi_{min}$, and $Zi_{min}$ and the $Xi_{max}$, $Yi_{max}$, and $Zi_{max}$ of the bounding box Bi are specified, for example, from the bounding box table 400 illustrated in FIG. 4. Additionally, the $X[j]_{min}$, $Y[j]_{min}$, and $Z[j]_{min}$ and the $X[j]_{max}$, $Y[j]_{max}$, and $Z[j]_{max}$ are specified, for example, from the element table 500 illustrated in FIG. 5.

If the elements Cj do not belong to the bounding box Bi, the determining unit 304 sequentially selects unselected bounding boxes Bi with the smallest volumes from the bounding boxes B1 to Bn. The determining unit 304 also determines that the element Cj belongs to the bounding box B0 if the element Cj does not belong to any bounding box among the bounding boxes B1 to Bn.

As a result, the bounding box Bi to which the plurality of elements Cj belong to can be uniquely specified. The determined results are stored in, for example, an affiliation target table 600 illustrated in FIG. 6. The affiliation target table 600 is realized, for example, by a storage device such as the RAM 203, the magnetic disc 205, and/or the optical disc 207. The following describes the stored contents of the affiliation target table 600.

Figure 6:
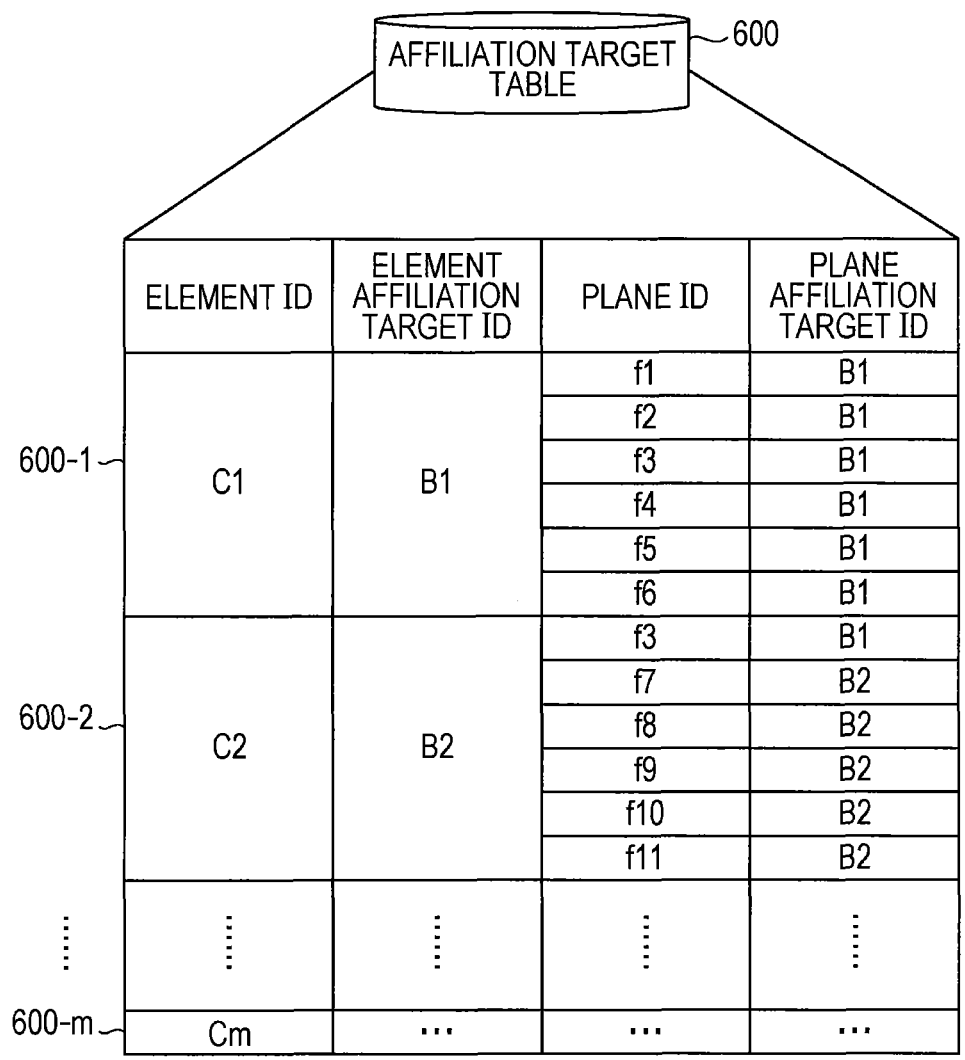
FIG. 6 illustrates an example of stored contents of an affiliation target table.

FIG. 6 describes an example of stored contents of the affiliation target table 600. In FIG. 6, the affiliation target table 600 includes fields for an element ID, an element affiliation target ID, a plane ID, and a plane affiliation target ID. By setting information in each field, affiliation target information 600-1 to 600-$m$ is stored as records.

The element ID is an identifier of an element divided from the bounding box B0. The element affiliation target ID is an identifier of the bounding box to which the element belongs. The plane ID is an identifier of the plane made up of the elements. Each plane is associated with apex coordinate positions that make up the plane in the Cartesian coordinate system made up of x, y, and z axes. The plane affiliation target ID is an identifier of the bounding box to which the plane belongs.

As an example, the element affiliation target ID "B1" of the element C1 and the plane affiliation target IDs of each plane f1 to f6 that make up the element C1 are represented in the affiliation target information 600-1. Similarly, as an example, the element affiliation target ID "B2" of the element C1 and the plane affiliation target IDs of the planes f3 and f7 to f11 that make up the element C2 are represented in the affiliation target information 600-2.

Among the planes that make up the element C2, the fact that the plane f3 that is included in the element C1 is included indicates that the elements C1 and C2 share the plane f3. The following is an explanation about affiliation examples of the planes that make up the element Cj divided from the bounding box B0.

Figure 7:
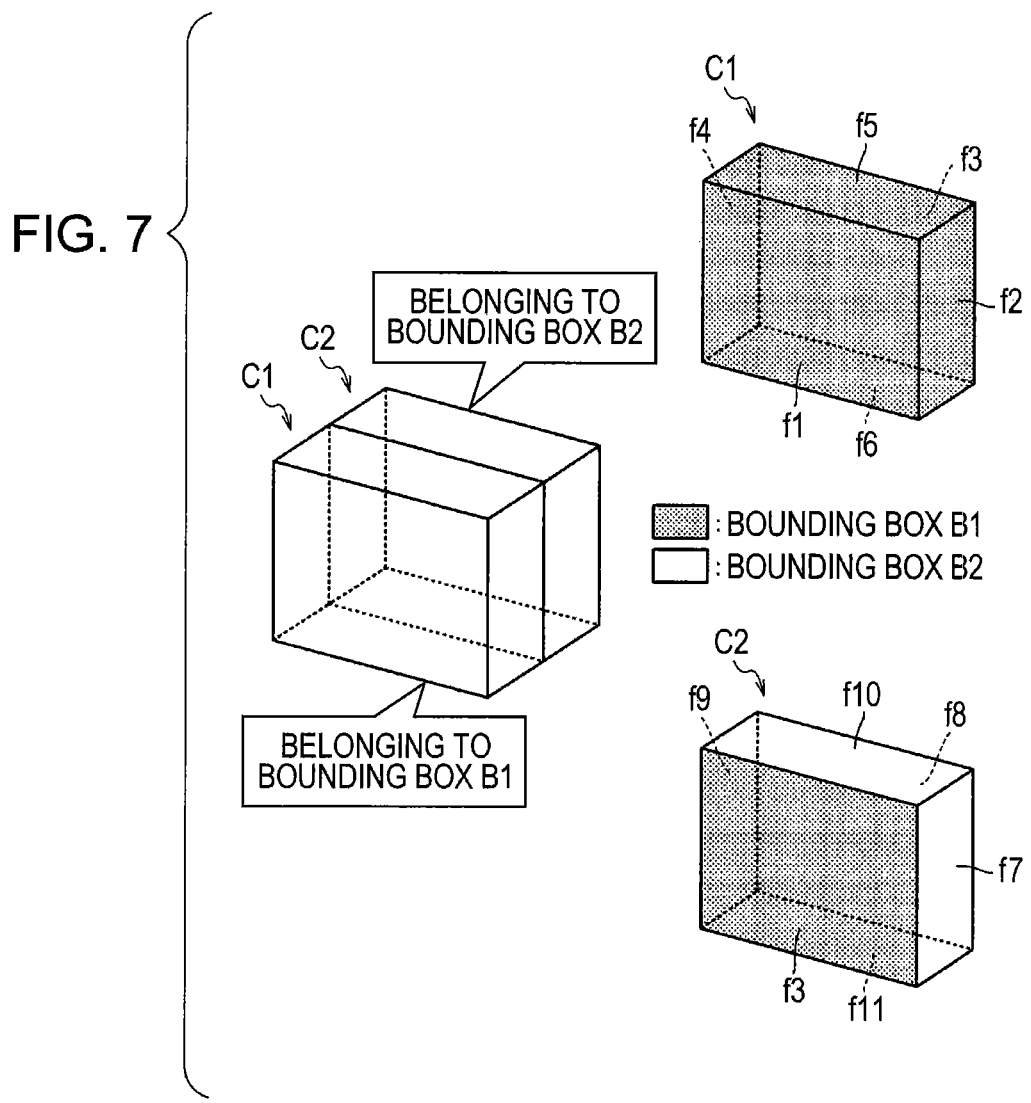
FIG. 7 illustrates affiliation examples of planes making up an element.

FIG. 7 describes affiliation examples of planes that make up an element. FIG. 7 illustrates elements C1 and C2 that are divided from the bounding box B0. It is assumed herein that after the element C1 is determined as belonging to the bounding box B1, the element C2 is determined as belonging to the bounding box B2.

First, when the element C1 is determined as belonging to the bounding box B1, "B1" is set in the element affiliation target ID field of the element C1 in the affiliation target table 600 (see FIG. 6). "B1" is setted in the plane affiliation target field for the planes f1 to f6 that make up the element C1 in the affiliation target table 600 (see FIG. 6). Since the plane f3 is shared between the elements C1 and C2, "B1" is setted in the plane affiliation target ID field for the plane f3 of the element C2 (see FIG. 6).

Next, "B2" is setted in the element affiliation target ID field of the element C2 in the affiliation target table 600 when it is determined that the element C2 belongs to the bounding box B2 (see FIG. 6). "B2" is setted in a field in which the information is unconfirmed in the plane affiliation target ID field for the planes f3 and f7 to f11 that make up the element C2 in the affiliation target table 600 (see FIG. 6). In other words, the affiliation target ID set first among the affiliation target IDs of the planes that make up each element Cj is prioritized.

Returning to the explanation of FIG. 3, the generating unit 305 includes the function of generating a spatial model (hereinbelow, referred to as "spatial subsystem") that indicates a space in which the assembly Abi exists according to the elements belonging to the bounding box Bi (where i=1, 2, ..., n). The space in which the assembly Abi exists is, for example, a sound field in which the assembly Abi exists.

Specifically, the generating unit 305 first specifies, for example, elements belonging to the bounding box Bi by referring to the affiliation target table 600. The generating unit 305 then refers to the element table 500 to generate a solid shaped spatial subsystem by merging the elements belonging to the bounding box Bi.

Herein, merging refers to coupling adjacent elements to generate one element based on the adjacency relationships between the elements. The generated spatial subsystem is one that includes, for example, information that specifies the planes of the spatial subsystem and the apexes that make up the planes in the Cartesian coordinate system made up of x, y, and z axes.

The generating unit 305 includes the function of generating a spatial subsystem that indicates a space different from the space in which the assembly Abi exists based on the elements belonging to the bounding box B0. Here, the elements belonging to the bounding box B0 may be elements among the elements C1 to Cn not belonging to any of the bounding boxes B1 to Bn.

Specifically, the generating unit 305 first specifies, for example, elements belonging to the bounding box B0 by referring to the affiliation target table 600. The generating unit 305 then refers to the element table 500 to generate solid shaped spatial subsystems by merging the elements belonging to the bounding box B0.

The elements belonging to the bounding box B0 may exist separately in a plurality of locations inside the bounding box B0. As a result, a plurality of spatial subsystems may be generated by merging the elements belonging to the bounding box B0. Examples of generating a spatial subsystem are described below with reference to FIGS. 11 and 12.

Hereinbelow, a spatial subsystem generated from elements belonging to the bounding box Bi is indicated as "spatial subsystem Ri" (where i=0, 1, 2, ..., n). As noted above, a plurality of spatial subsystems may be generated from the elements belonging to the bounding box B0, but the spatial subsystems will simply be described as "spatial subsystem R0" in the following explanation.

The generating unit 305 also includes the function of generating a plate model (hereinbelow, referred to as a "structural subsystem") that surrounds a space in which the assembly Abi exists. The generating unit 305 also includes the function of generating a structural subsystem that represents a plate that surrounds a space different from the space in which the assembly Abi exists.

Here, the structural subsystem is a system that is a tabular model and represents walls surrounding a sound field. Specifically, the generating unit 305 generates, for example, a structural subsystem for each plane by extracting each plane that forms the spatial subsystem Ri. In other words, a structural subsystem is a system of merged planes of elements that make up the surfaces of the spatial subsystem Ri.

The generated structural subsystem is one that includes, for example, information that specifies the apexes that make up the structural subsystem in the Cartesian coordinate system made up of x, y, and z axes. Specific processing to generate a structural subsystem is explained below with reference to FIGS. 11 and 12.

Hereinbelow, the structural subsystem corresponding to the planes that form the spatial subsystem Ri are indicated as "structural subsystems Si(1) to Si(K)." Moreover, an arbitrary structural subsystem among the structural subsystems Si(1) to Si(K) will be indicated as "structural subsystem Si(k)" (where k=1, 2, ..., K). An arbitrary structural subsystem among all the structural subsystems will be described as "structural subsystem S."

The searching unit 306 includes a function to search for a combination of an adjacent spatial subsystem Ri and a structural subsystem S among the groups of generated models. Hereinbelow, the group of models represents a collection of structural subsystems Si(1) to Si(K) corresponding to the planes that form each spatial subsystem Ri and the spatial subsystems R0 to Rn. An adjacency relationship between the subsystems is used for building networks to indicate the coupling of acoustic vibration energies.

Specifically, the searching unit 306, for example, may search for combinations of a spatial subsystem Ri and structural subsystems Si(1) to Si(K) corresponding to the planes that form the spatial subsystem Ri. Moreover, the searching unit 306, for example, may search for combinations of structural subsystems S and spatial subsystems Ri having shared plane elements.

Having shared plane elements refers to the sharing of a certain plane of an element by a spatial subsystem Ri and a structural subsystem S. An example of a plane element shared between a spatial subsystem Ri and a structural subsystem S is explained with reference to FIG. 8.

Figure 8:
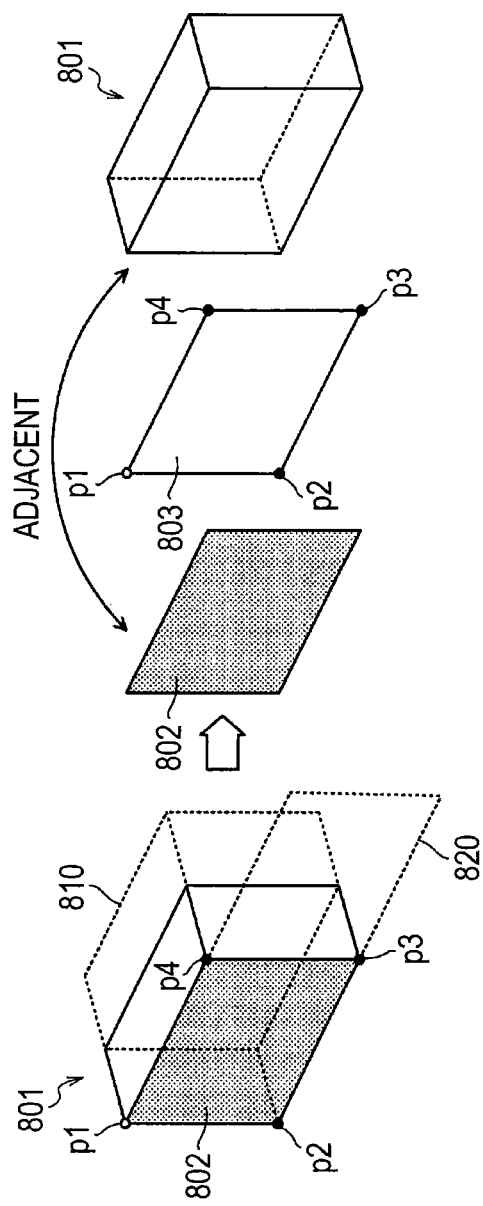
FIG. 8 illustrates an example of shared plane elements.

FIG. 8 describes an example of a shared plane element. In FIG. 8, an element 801 is one element included in a spatial subsystem 810 (dotted line in FIG. 8). A plane 802 is one element plane included in a spatial subsystem 820 (dotted line in FIG. 8). The element 801 and the plane 802 have a plane element 803 that shares apexes p1 to p4.

In this case, the searching unit 306 searches for a combination of the spatial subsystem 810 and the structural subsystem 820 having the shared plane element 803. As a result, the adjacent spatial subsystem Ri and the structural subsystem S may be specified in the Cartesian coordinate system made up of the x, y, and z axes.

Moreover, the searching unit 306 includes a function to search for a combination of a first structural subsystem and a second structural subsystem that are adjacent to each other among the groups of generated models. Specifically, the searching unit 306, for example, may search for combinations of a first structural subsystem and a second structural subsystem having a shared line element.

Having a shared line element refers to the sharing of a line of a certain element by the first structural subsystem and the second structural subsystem. An example of a line element shared by the first structural subsystem and the second structural subsystem is described with reference to FIG. 9.

Figure 9:
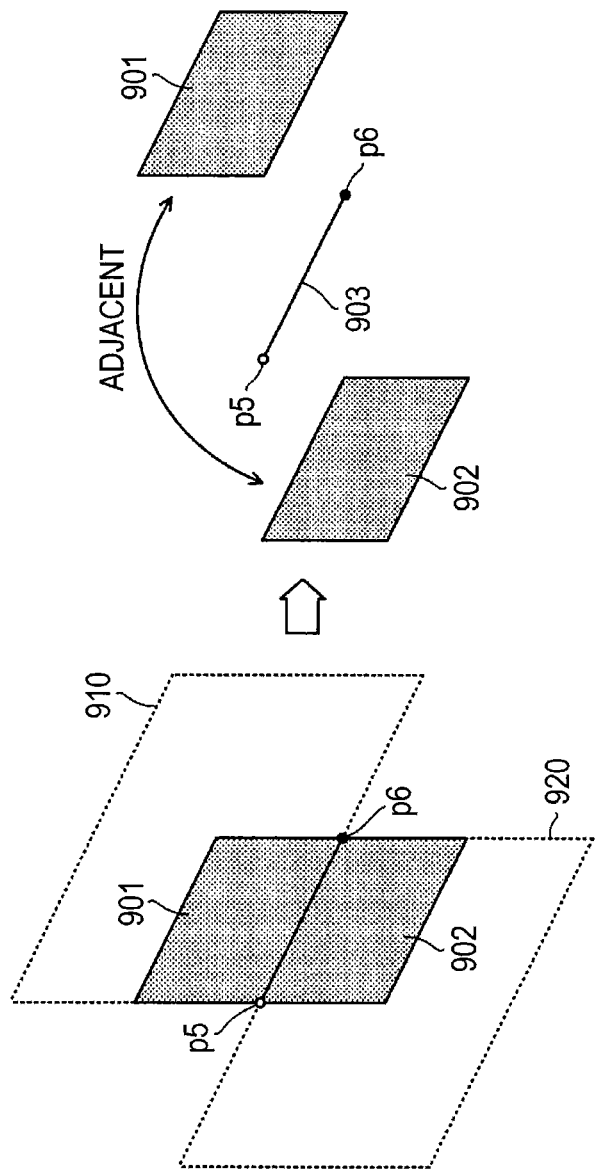
FIG. 9 illustrates an example of a shared line element.

FIG. 9 describes an example of a shared line element. In FIG. 9, a plane 901 is one plane element that makes up a structural subsystem 910. A plane 902 is one plane element that makes up a structural subsystem 920. The planes 901 and 902 include a shared line element 903 having apexes p5 and p6.

In this case, the searching unit 306 searches for a combination of the structural subsystem 910 and the structural subsystem 920 having the shared line element 903 among the group of models. As a result, the first structural subsystem and the second structural subsystem that are adjacent to each other may be specified in the Cartesian coordinate system made up of the x, y, and z axes.

The calculating unit 307 includes a function of calculating a volume Vi of the spatial subsystem Ri. Specifically, the calculating unit 307, for example, calculates the volume Vi of the spatial subsystem Ri based on coordinate positions of apexes making up planes that form the spatial subsystem Ri.

Moreover, the calculating unit 307 has a function to calculate a surface area SAi of the spatial subsystem Ri. Specifically, the calculating unit 307, for example, calculates the surface area SAi of the spatial subsystem Ri based on coordinate positions of apexes making up planes that form the spatial subsystem Ri.

The setting unit 308 includes a function to set the calculated volume Vi and/or the surface area SAi of the spatial subsystem Ri. Specifically, the setting unit 308 stores the volume Vi and the surface area SAi of the spatial subsystem Ri in association with each other in, for example, the RAM 203, the magnetic disc 205, the optical disc 207 or the like.

Moreover, the calculating unit 307 has a function to calculate an area Ai(k) of the structural subsystem Si(k). Specifically, the calculating unit 307, for example, calculates the area Ai of the structural subsystem Si(k) based on coordinate positions of apexes making up the structural subsystem Si(k).

The setting unit 308 also has a function to set the calculated area Ai(k) of the structural subsystem Si(k). Specifically, the setting unit 308 stores the area Ai and the structural subsystem Si(k) in association with each other in, for example, the RAM 203, the magnetic disc 205, the optical disc 207 or the like.

The setting unit 308 also has a function to set a material property of an assembly Abi of the spatial subsystem Ri. Herein, the material property may be, for example, the name, the density, the Young's modulus and the like of a material included in the assembly Abi. The material properties in each assembly Abi are specified, for example, in design information related to the object.

Specifically, the setting unit 308 first refers to the bounding box table 400, for example, and specifies the assembly Abi corresponding to the spatial subsystem Ri, in other words, the bounding box Bi. The setting unit 308 then refers to the design information related to the object to specify a material property of the material with the largest volume among the materials included in the assembly Abi.

The setting unit 308 then stores the material property of the material with the largest volume of the materials included in the assembly Abi in association with the spatial subsystem Ri in, for example, a storage device such as the RAM 203, the magnetic disc 205, the optical disc 207 or the like. The setting unit 308 sets the material property of the material with the largest volume among the materials included in the object for the spatial subsystem R0.

As a result, the material property of the assembly Abi existing in a sound field represented by the spatial subsystem Ri may be setted as a property of the spatial subsystem Ri.

The setting unit 308 also has a function to set a material property of an assembly Abi for the structural subsystem Si(k). Specifically, the setting unit 308 sets, for example, the material property of a material set for the spatial subsystem Ri corresponding to the structural subsystem Si(k), for the structural subsystem Si(k).

As a result, the material property of the assembly Abi existing in the sound field surrounded by walls representing the structural subsystem Si(k) can be setted as a property of the structural subsystem Si(k).

The output unit 309 has a function to output analytical model data related to the object. Specifically, the output unit 309 outputs, for example, the generated spatial subsystem Ri. The output unit 309 may also output the volume Vi and/or the material property of the assembly Abi set for the spatial subsystem Ri together at that time.

The output unit 309 also outputs the generated structural subsystem Si(k). The output unit 309 may also output the area Ai(k) and/or the material property of the assembly Abi set for the structural subsystem Si(k) together at that time.

The output unit 309 also outputs the searching results. Specifically, the output unit 309 may output, for example, the spatial subsystem Ri along with information specifying the structural subsystem Si(k) adjacent to the spatial subsystem Ri. The output unit 309 may also output, for example, the first structural subsystem along with information specifying the spatial subsystem Ri and/or the second structural subsystem adjacent to the first structural subsystem.

Forms of the outputs conducted by the output unit 309 include, for example, displays to the display 208, print outputs to the printer 213, or transmissions to an external device through the I/F 209. Moreover, the outputs may also include storing in a storage region such as the RAM 203, the magnetic disc 205, and the optical disc 207. A detailed example of outputted analytical model data is described below with reference to FIGS. 13 to 17.

In the above description, the determining of the affiliation of the element Cj is conducted by sequentially selecting bounding boxes Bi with the smallest volumes. However, the embodiment is not limited as such. For example, the determining unit 304 may also determine the affiliation of the element Cj by sequentially selecting bounding boxes Bi with the largest volumes from the bounding boxes B1 to Bn excluding the bounding box B0.

The following is a description of an example of partitioning the bounding box B0 that surrounds the object and dividing the bounding box B0 into a plurality of elements.

Figure 10:
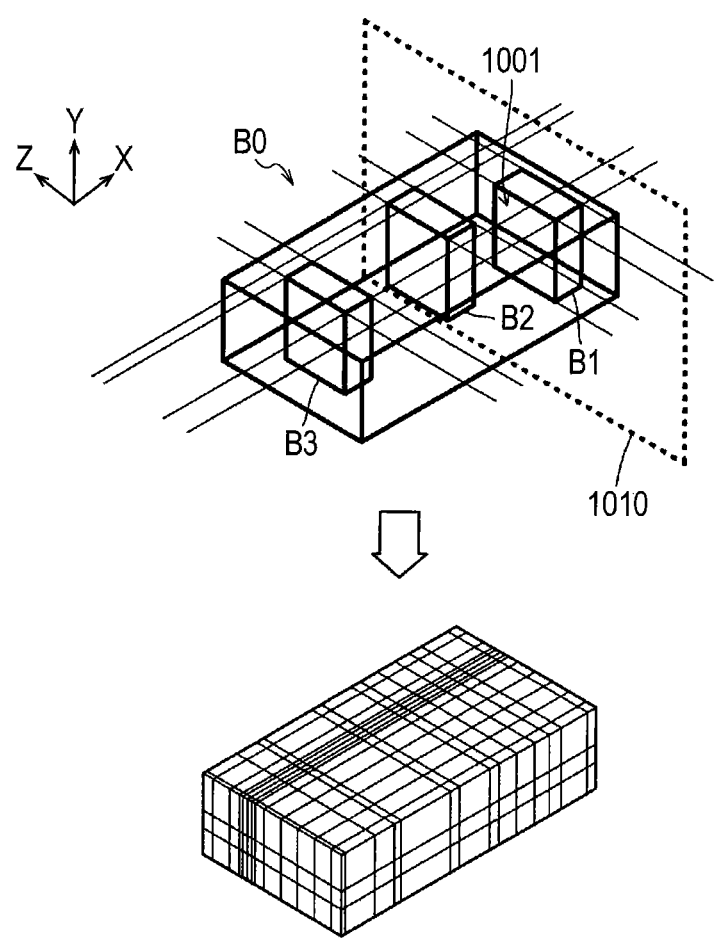
FIG. 10 illustrates an example of dividing a bounding box.

FIG. 10 describes an example of dividing a bounding box. FIG. 10 illustrates the bounding box B0 that surrounds the object, and bounding boxes B1 to B3 that surround assemblies Ab1 to Ab3. FIG. 10 illustrates extracted portions of the bounding boxes that surround the assemblies.

The dividing unit 303 partitions the bounding box B0 to form the plurality of elements C1 to Cm from flat surfaces (hereinbelow referred to as "cut sections") including the planes of the bounding box Bi (where i=0, 1, 2, . . . , n). In the example in FIG. 10, the bounding box B0 is partitioned by a cut section 1010 that includes a plane 1001 of the bounding box B1.

Herein, a degree of length that encompasses sound wave wavelengths subject to the acoustic vibration analysis is desirably secured as the length of one side of each element Cj. Thus the dividing unit 303, for example, sorts the x-, y-, and z-axis coordinate positions of the intersections of the cut sections and the axes in ascending order.

The dividing unit 303 then calculates a distance between a first intersection and a second intersections that are adjacent to each other on an axis in the ascending order of the coordinate positions on that axis. The dividing unit 303 erases a cut section that includes the second intersection if the distance between the first and second intersections is equal to or lower than a certain threshold. Specifically, the dividing unit 303 decides not to partition the bounding box B0 with the cut section that includes the second intersection.

At this time, the dividing unit 303 erases the intersection one before the last intersection if the last intersection is to be erased, so as not to erase the last intersection on the axis (i.e., the intersection with the largest coordinate position). As a result, erasing of the intersection of the axis and the cut section that includes a plane of the bounding box B0 can be inhibited.

A threshold L is setted to a degree of length (for example, L=30 mm) that encompasses the sound wave wavelengths subject to the acoustic vibration. As a result, the degree of length that encompasses the sound wave wavelengths subject to the acoustic vibration analysis may be secured as the length of one side of each element Cj. The threshold L is stored in a storage device such as the ROM 202, the RAM 203, the magnetic disc 205, and the optical disc 207.

The following describes an example of generating the spatial subsystem Ri and the structural subsystem Si(k) based on the elements that belong to the bounding box Bi.

Figure 11:
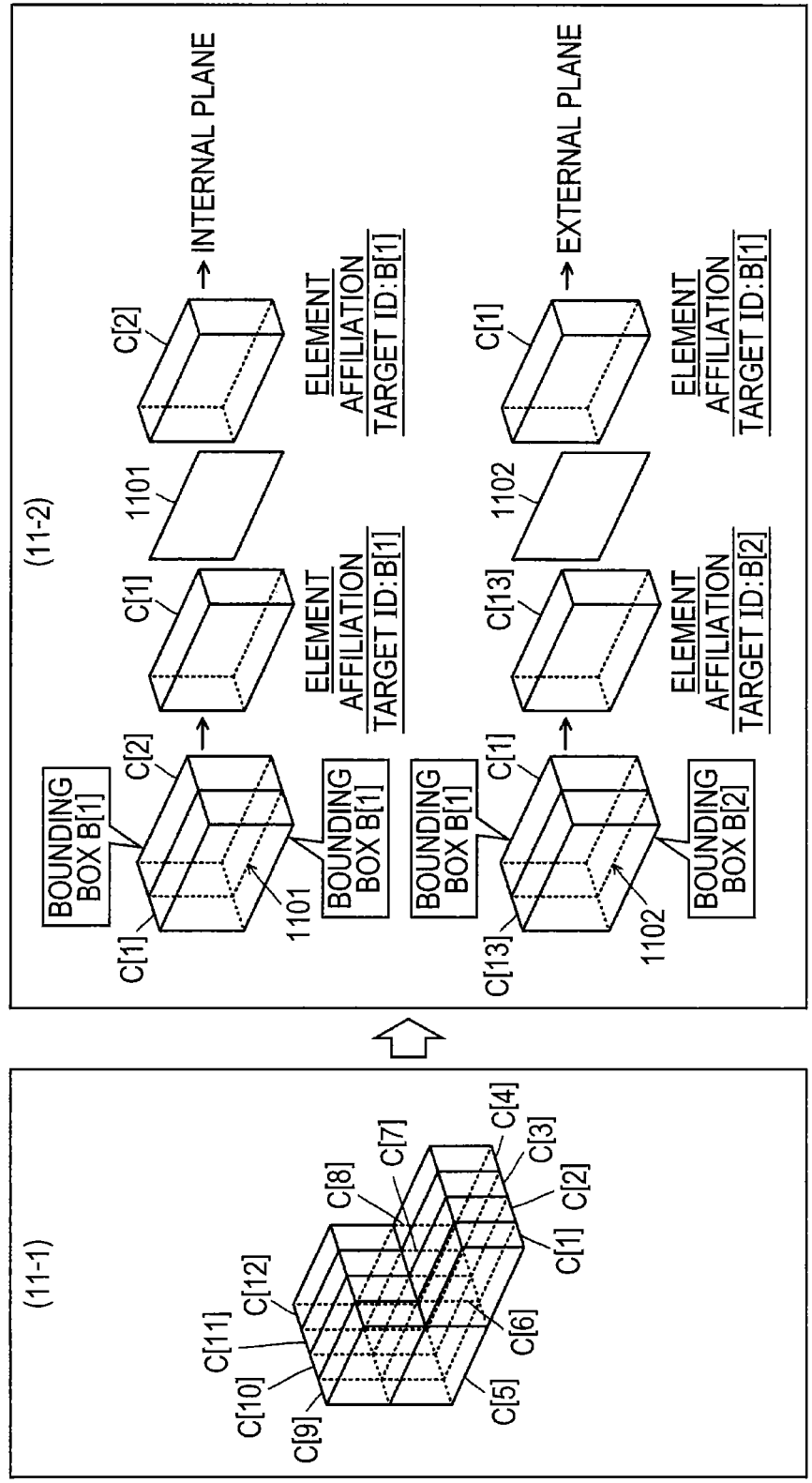
FIG. 11 is a first descriptive drawing of an example of generating a spatial subsystem and a structural subsystem.
Figure 12:
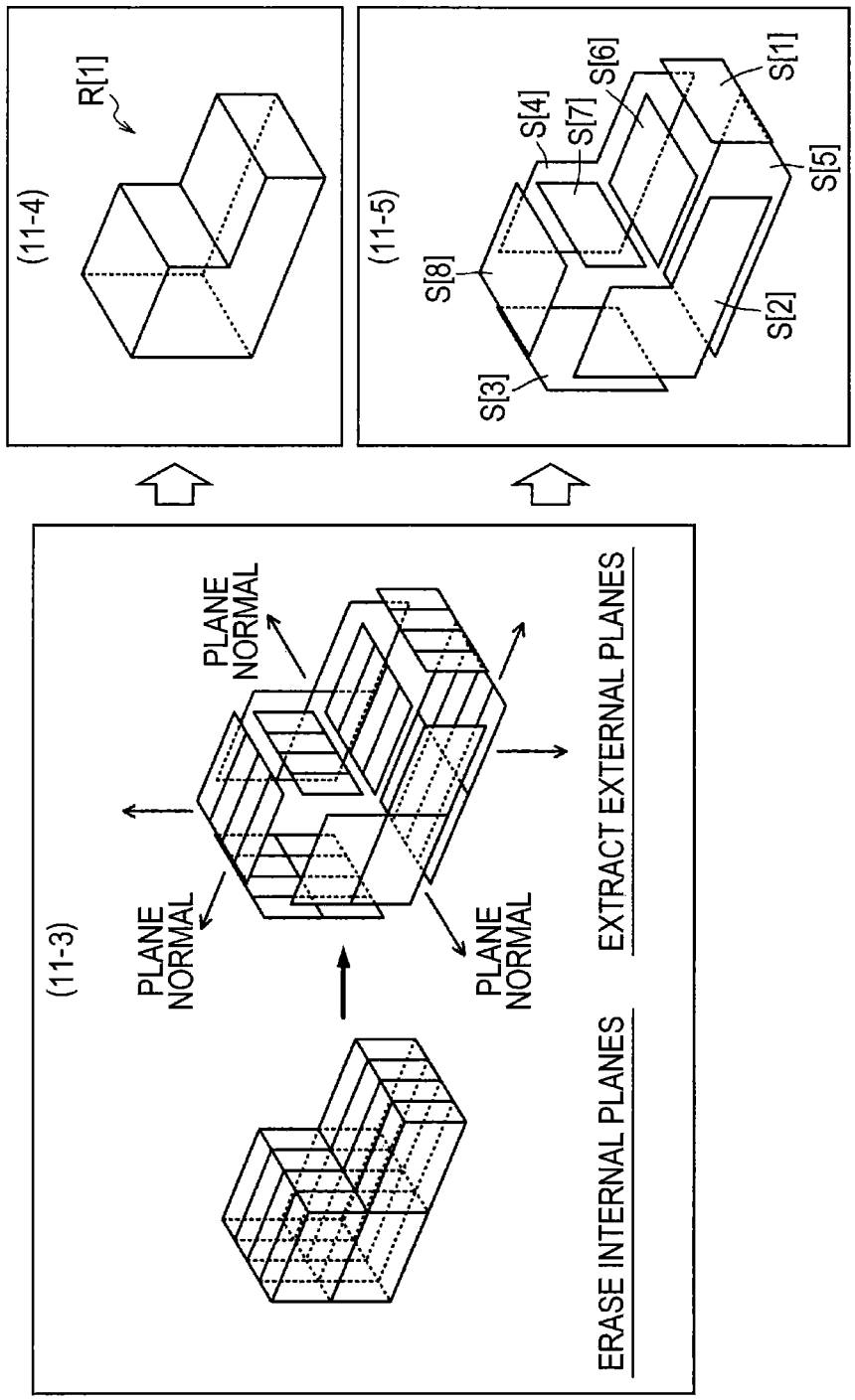
FIG. 12 is a second descriptive drawing of an example of generating a spatial subsystem and a structural subsystem.

FIGS. 11 and 12 describe an example of generating a spatial subsystem and a structural subsystem. (11-1) of FIG. 11 illustrates elements C[1] to C[12] that belong to the bounding box B[1].

The generating unit 305 determines whether the planes of the elements C[1] to C[12] belonging to the bounding box B[1] are internal or external planes. An internal plane is a plane that is not an outer surface of the spatial subsystem Ri. An external plane is a plane that is an outer surface of the spatial subsystem Ri.

Specifically, the generating unit 305 determines, for example, whether or not element affiliation target IDs of elements adjacent to each other through any of the planes of the elements C[1] to C[12] match based on the adjacency relationships between the elements. The element affiliation target IDs of the elements are specified from, for example, the affiliation target table 600. If element affiliation target IDs match, the generating unit 305 determines that the corresponding plane is an internal plane. Conversely, if the element affiliation target IDs do not match, the generating unit 305 determines that the corresponding plane is an external plane.

In the example illustrated in (11-2) of FIG. 11, a plane 1101 is determined to be an internal plane since the element affiliation target IDs of the element C[1] and the element C[2] that are adjacent to each other through the plane 1101 of the element C[1] match. Conversely, a plane 1102 is determined to be an external plane since the element affiliation target IDs of the element C[1] and the element C[13] that are adjacent to each other through the plane 1102 of the element C[1] do not match.

In (11-3) in FIG. 12, the generating unit 305 erases the internal planes from the collection of planes of the elements C[1] to C[12]. The generating unit 305 then extracts groups of external planes that are adjacent and have the same plane normal lines from the collection of the remaining external planes according to the adjacency relationships between the elements.

In (11-4) in FIG. 12, the generating unit 305 generates the planes to form a spatial subsystem R[1] by merging the extracted external plane groups. The generating unit 305 then generates the spatial subsystem R[1] by merging the generated planes. As a result, information that specifies the planes that form the spatial subsystem R[1] and information specifies the apexes that make up the planes can be generated.

In (11-3) in FIG. 12, the generating unit 305 extracts groups of external planes that are adjacent, that have the same plane normal lines, and in which the plane affiliation target ID is the same as the element affiliation target ID, from the collection of the remaining external planes according to the adjacency relationships between the elements. The plane element affiliation target IDs and the element affiliation target IDs are specified from, for example, the affiliation target table 600.

In (11-5) in FIG. 12, the generating unit 305 generates structural subsystems S[1] to S[8] by merging the extracted external plane groups. As a result, information that specifies the apexes that make up the structural subsystems S[1] to S[8] can be generated. Moreover, when extracting the external plane groups, the duplication and generation of structural subsystems between adjacent spatial subsystems may be inhibited by extracting external plane groups in which the plane affiliation target IDs and the element affiliation target IDs match.

The generating unit 305 may also generate 3-dimensional shapes of the spatial subsystem R[1] and the structural subsystems S[1] to S[8] by applying a polygon to the external planes of the elements C[1] to C[12]. As a result, a designer or the like may check model shapes by displaying the spatial subsystem R[1] and/or the structural subsystems S[1] to S[8] on the display 208.

The following describes an analytical model data related to an object outputted by the output unit 309 with reference to FIGS. 13 to 17.

Figure 13:
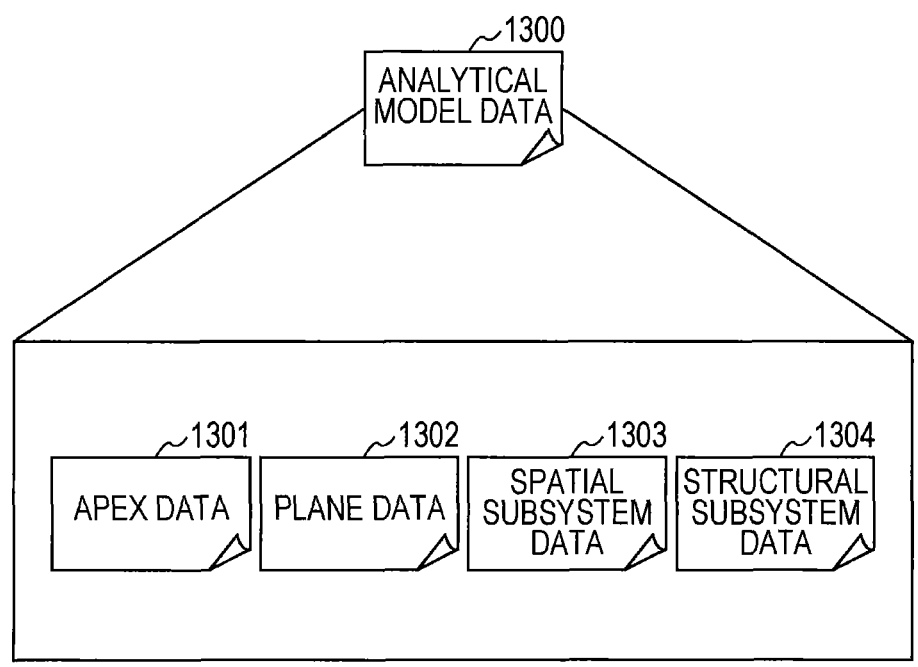
FIG. 13 illustrates a detailed example of analytical model data.

FIG. 13 describes a detailed example of analytical model data. In FIG. 13, analytical model data 1300 is information that describes an analytical model related to an object, and is used, for example, in acoustic vibration analysis using the SEA method. Specifically, the analytical model data 1300 includes apex data 1301, plane data 1302, spatial subsystem data 1303, and structural subsystem data 1304.

The apex data 1301 is information that indicates apex coordinate positions inside an analytical model related to the object. The plane data 1302 is information that indicates apexes that make up the planes inside the analytical model. The spatial subsystem data 1303 is information that indicates the spatial subsystems Ri included in the analytical model. The structural subsystem data 1304 is information that indicates the structural subsystems S included in the analytical model.

Figure 14:
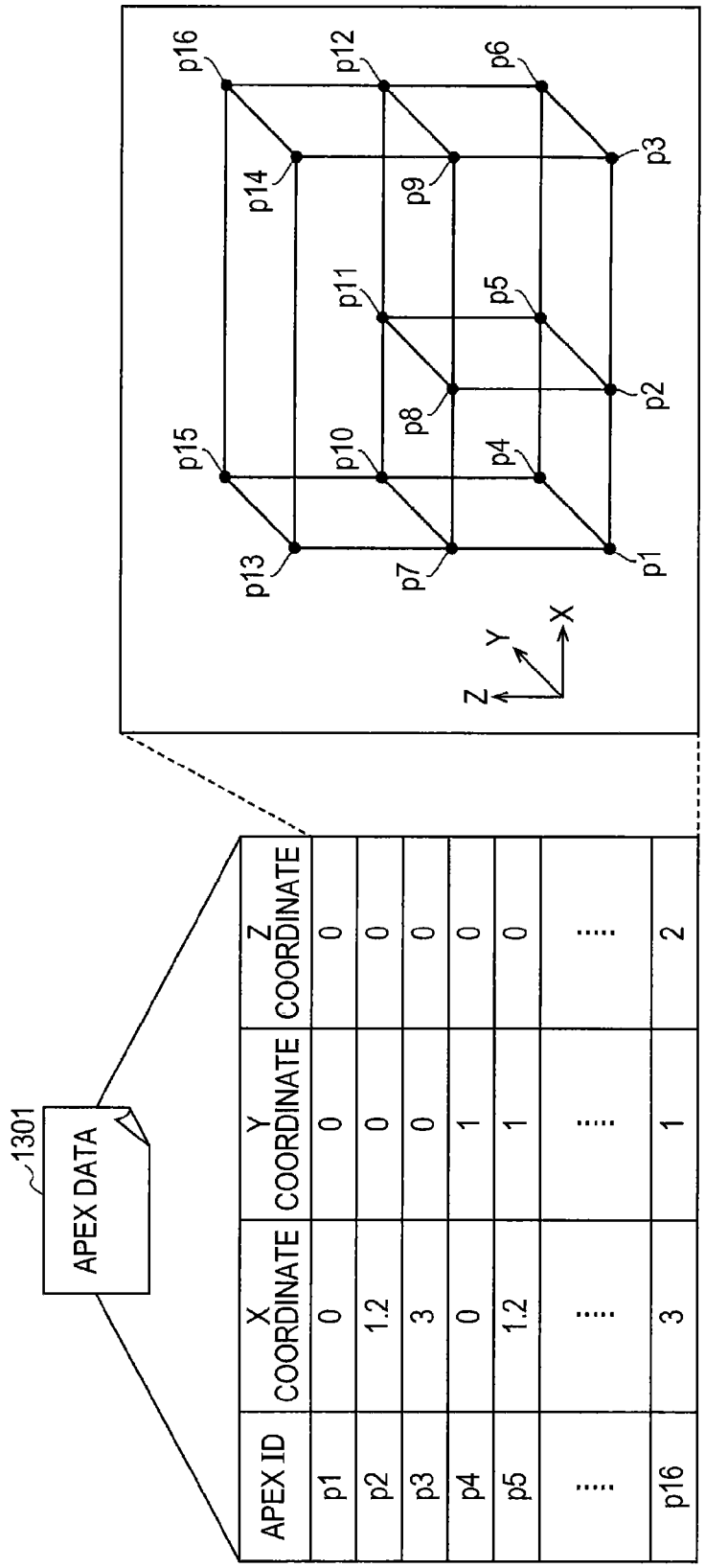
FIG. 14 illustrates a detailed example of apex data.

FIG. 14 describes a detailed example of apex data. In FIG. 14, the apex data 1301 is information that indicates the coordinate positions of apexes p1 to p16 inside an analytical model. For example, the apex p1 is described by coordinate positions (X, Y, Z)=(0, 0, 0).

Figure 15:
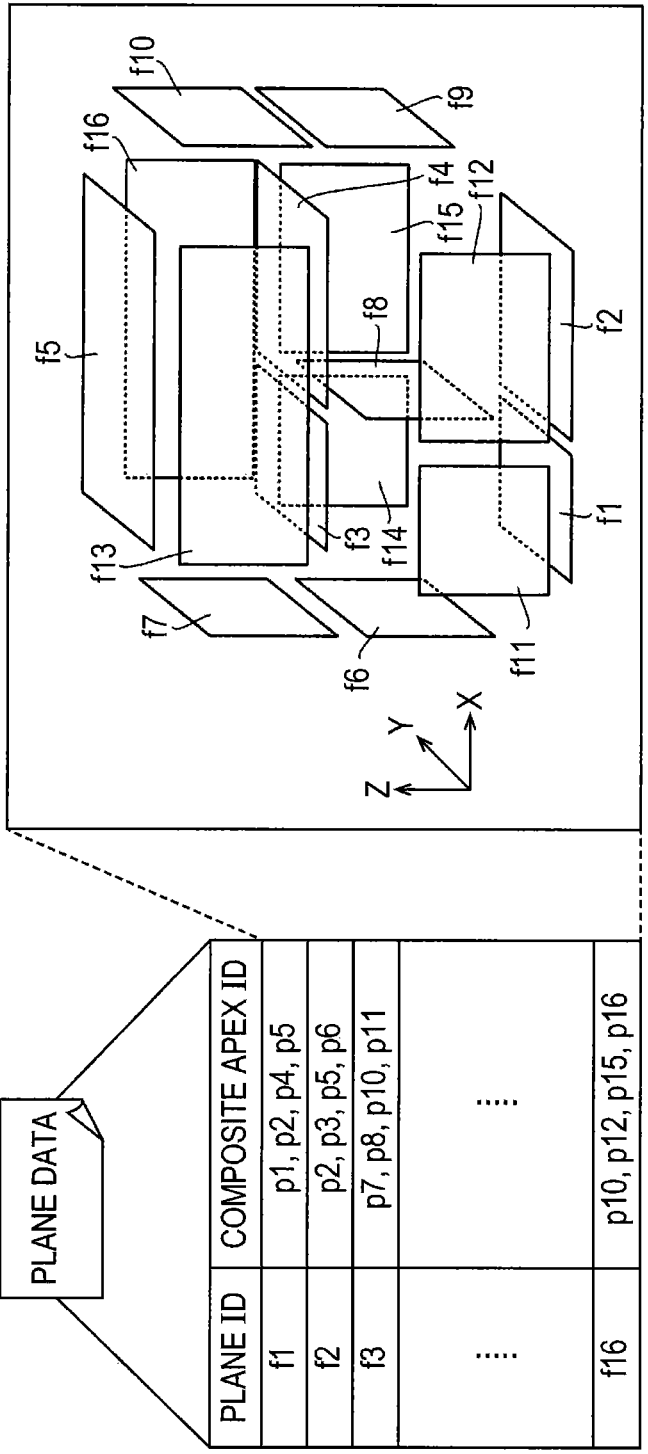
FIG. 15 illustrates a detailed example of plane data.

FIG. 15 describes a detailed example of plane data. In FIG. 15, the plane data 1302 is information that indicates apexes that make up the planes f1 to f16 inside the analytical model. For example, a plane f1 is described by apexes p1, p2, p4, and p5 that make up the plane f1.

Figure 16:
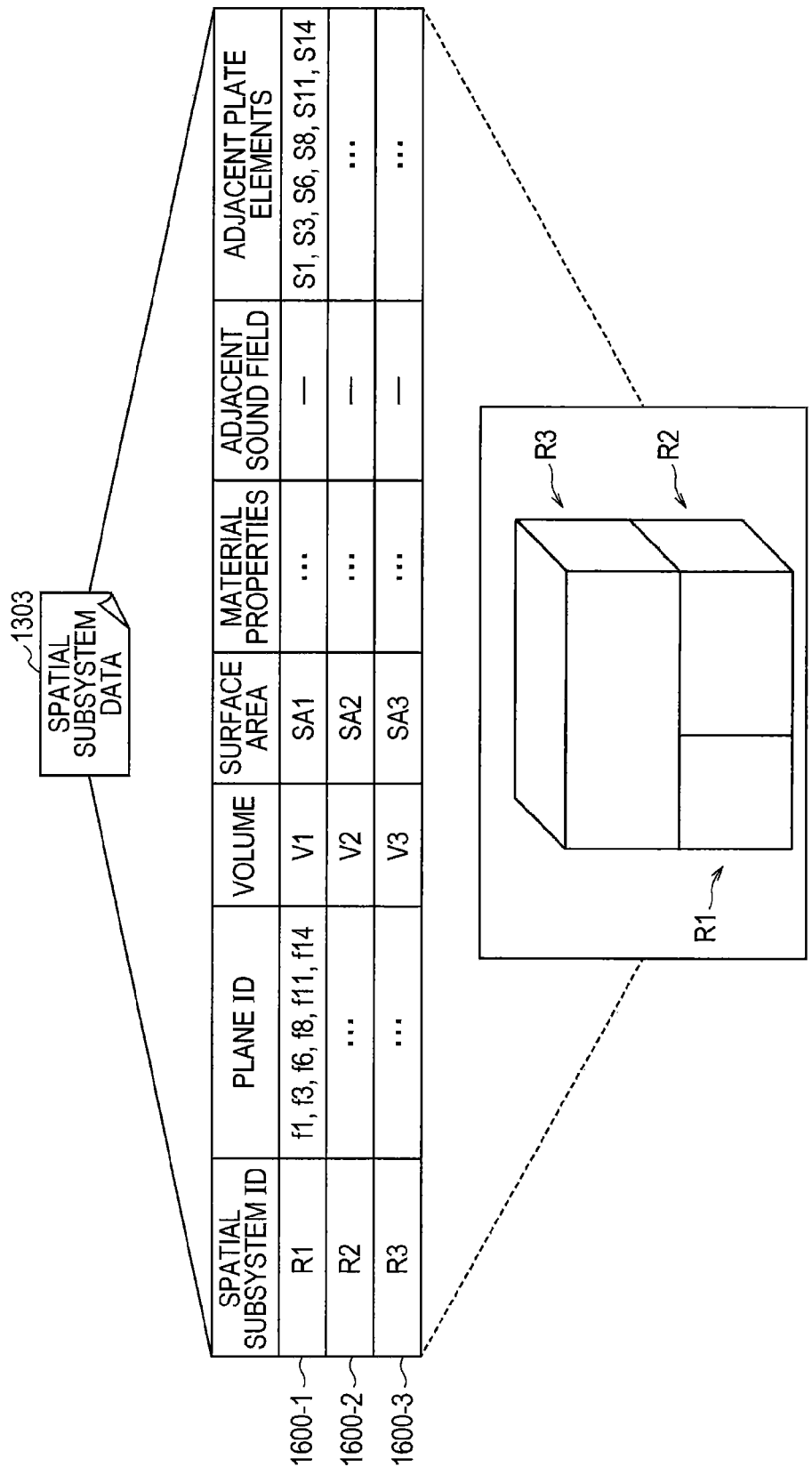
FIG. 16 illustrates a detailed example of spatial subsystem data.

FIG. 16 describes a detailed example of spatial subsystem data. In FIG. 16, the spatial subsystem data 1303 includes fields for a spatial subsystem ID, a plane ID, a volume, a surface area, a material property, an adjacent sound field, and adjacent plate elements. By setting information in each field, spatial subsystem information 1600-1 to 1600-3 is stored as records.

The spatial subsystem ID is an identifier of the spatial subsystem Ri. The plane ID is an identifier of the planes that make up the spatial subsystem Ri. The volume is the volume Vi of the spatial subsystem Ri. The surface area is the surface area SAi of the spatial subsystem Ri. The material property is the material property of the assembly Abi set for the spatial subsystem Ri.

The adjacent sound field is an identifier of a spatial subsystem adjacent to the spatial subsystem Ri. The adjacent plate elements are identifiers of a structural subsystem adjacent to the spatial subsystem Ri. The spatial subsystem Ri is surrounded by the structural subsystems S(1) to S(K), and the adjacent sound field in the initial state is "-" (null) since no other spatial subsystem is adjacent.

However, a plurality of spatial subsystems may be adjacent when, for example, a structural subsystem Si(k) is manually erased from the analytical model related to the object by a user input operation. Moreover, the abovementioned searching unit 306 may search for a combination of a first spatial subsystem and a second spatial subsystem that are adjacent to each other from the model group after the structural subsystem Si(k) has been erased.

Specifically, the searching unit 306, for example, searches for a combinations of a first spatial subsystem and a second spatial subsystem having shared plane elements. As a result, when another spatial subsystem adjacent to the spatial subsystem Ri is found, the spatial subsystem ID of the other spatial subsystem is setted in the abovementioned field of the adjacent sound field.

Figure 17:
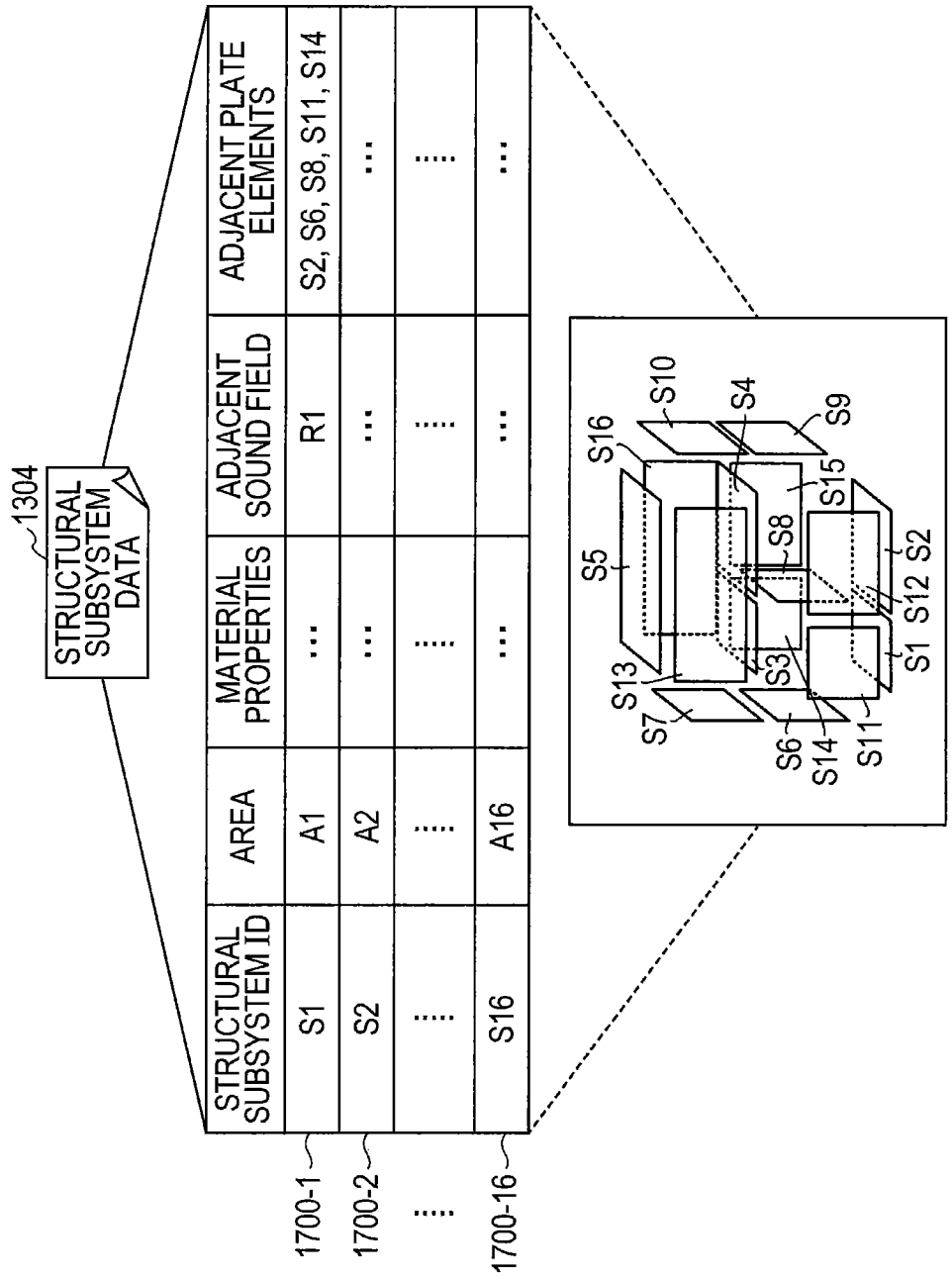
FIG. 17 illustrates a detailed example of structural subsystem data.

FIG. 17 describes a detailed example of structural subsystem data. In FIG. 17, the structural subsystem data 1304 includes fields for a structural subsystem ID, an area, a material property, an adjacent sound field, and adjacent plate elements. By setting information in each field, structural subsystem information 1700-1 to 1700-16 is stored as records.

The structural subsystem ID is an identifier of the structural subsystem S. The area is the area of the structural subsystem S. The material property is the material property of the assembly Abi set for the structural subsystem S. The adjacent sound field is an identifier of a spatial subsystem adjacent to the structural subsystem S. The adjacent plate elements are identifiers of a structural subsystem adjacent to the structural subsystem S.

A user may conduct acoustic vibration analysis of an object using the SEA method by using the analytical model data 1300. Specifically, the user sets, for example, sound source components and hole information (for example, hole shapes and positions) in the analytical model data 1300. The user also may conduct editing such as modifying or erasing subsystems or setting various properties related to transmission properties of the acoustic vibration while checking polygon data of the analytical model displayed, for example, on the display 208. The user may then conduct acoustic vibration analysis on the object by inputting the analytical model data 1300 into an acoustic vibration analysis solver.

Figure 18:
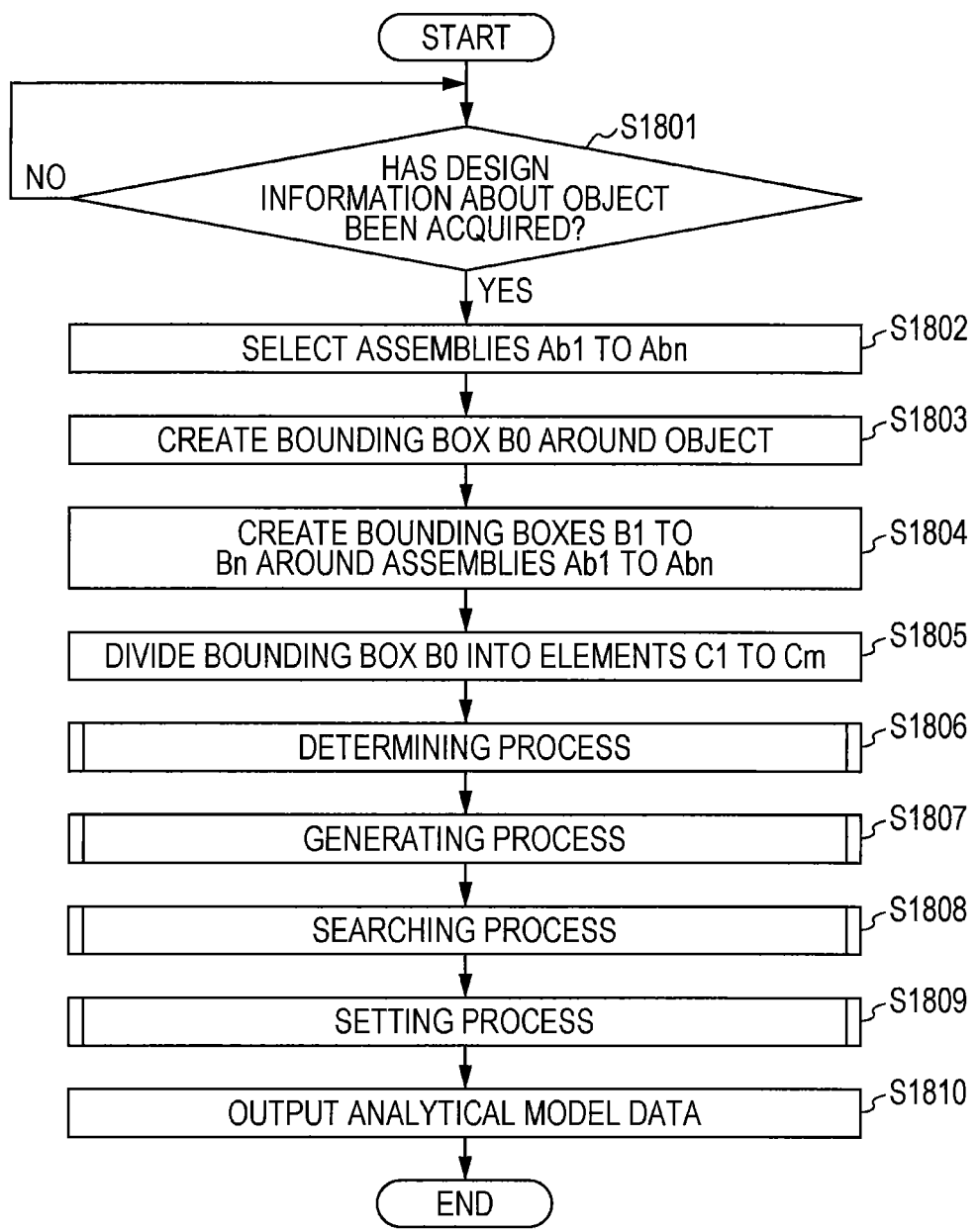
FIG. 18 is a flow chart of analytical support procedures of the analytical support device according to the embodiment.

The following is an explanation of analytical support processing of the analytical support device 100 according to the embodiment. FIG. 18 is a flow chart of analytical support procedures of the analytical support device 100 according to the embodiment. In the flow chart illustrated in FIG. 18, it is first determined whether or not design information related to an object has been acquired by the acquiring unit 301 (S1801).

The processing waits if no design information has been acquired by the acquiring unit 301 (S1801: No). If design information has been acquired (S1801: Yes), the creating unit 302 selects assemblies Ab1 to Abn from the object (S1802).

The creating unit 302 then creates a bounding box B0 surrounding the object in the Cartesian coordinate system made up of x, y, and z axes (S1803). The creating unit 302 then creates bounding boxes B1 to Bn surrounding the selected assemblies Ab1 to Abn in the Cartesian coordinate system made up of x, y, and z axes (S1804).

The dividing unit 303 then partitions the bounding box B0 surrounding the object into a grid pattern and divides the bounding box B0 into elements C1 to Cm (S1805). The determining unit 304 then conducts a determining process to determine elements belonging to the bounding box Bi from the elements C1 to Cm (S1806).

The generating unit 305 then conducts a generating process to generate subsystems based on the elements belonging to the bounding boxes Bi (S1807). Then the searching unit 306 conducts a searching process to search for combinations of adjacent subsystems from the group of generated models (S1808).

The setting unit 308 then conducts a setting process to set various properties for the subsystems (S1809). The output unit 309 then outputs the analytical model data related to the object (S1810) and the series of processes in this flow chart are finished.

As a result, an acoustic vibration analysis analytical model related to object can be generated using the SEA method.

The following is a detailed explanation of the determining process conducted in S1806 in FIG. 18.

Figure 19:
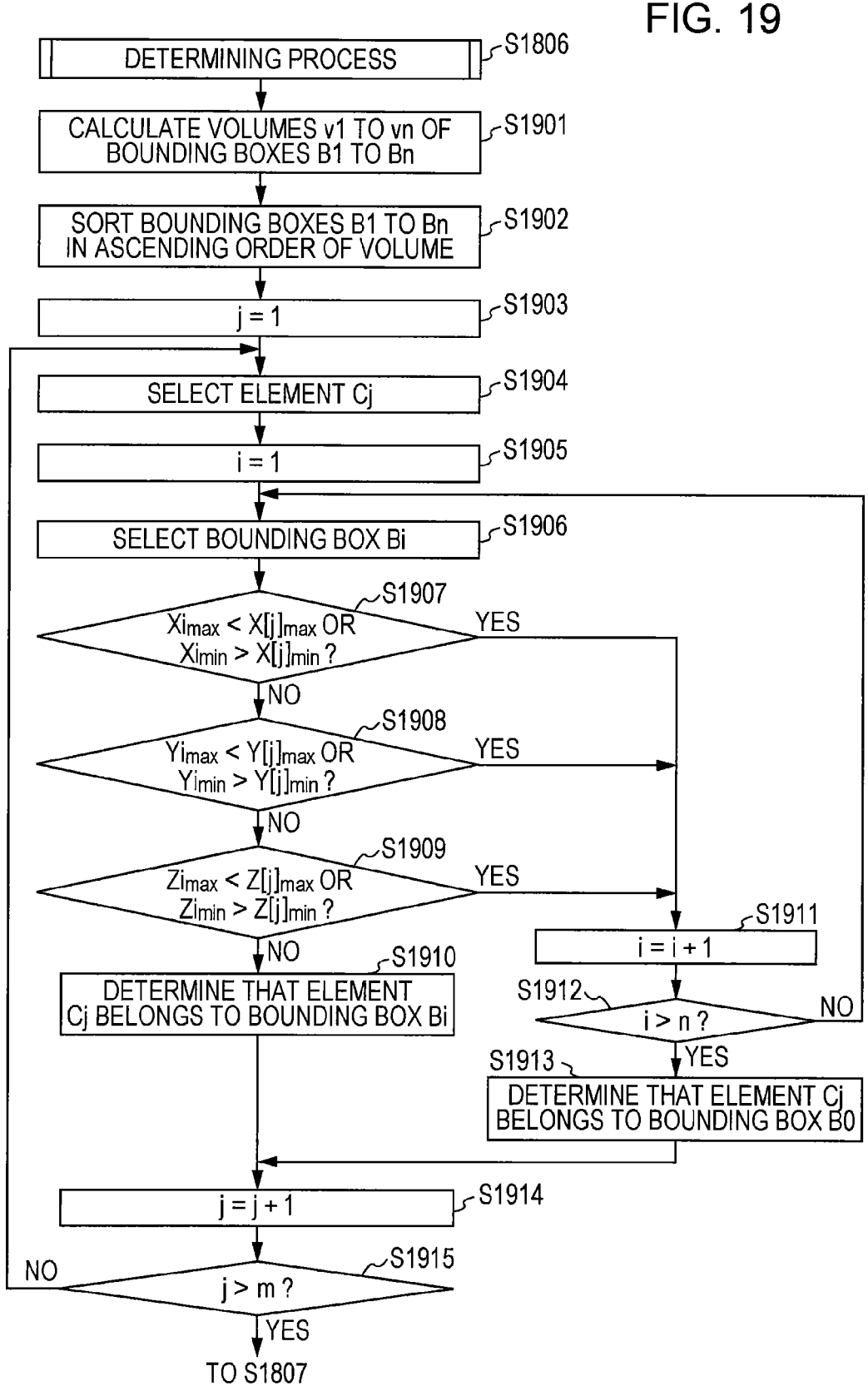
FIG. 19 is a flowchart of an example of a detailed determining process.

FIG. 19 is a flowchart of an example of a detailed determining process. In FIG. 19, the determining unit 304 first calculates, for example, volumes v1 to vn of the bounding boxes B1 to Bn (S1901).

The determining unit 304 then sorts the volumes of the bounding boxes B1 to Bn in ascending order (S1902). For the purpose of explanation, "n" number of sorted bounding boxes are described as "bounding boxes B1 to Bn."

The determining unit 304 then assigns 1 to the "j" of the element Cj so that "j=1" (S1903), and selects the element Cj from the elements C1 to Cm (S1904). The determining unit 304 then assigns 1 to the "i" of the bounding box Bi so that "i=1" (S1905), and selects the bounding box Bi from the bounding boxes B1 to Bn (S1906).

The determining unit 304 then determines whether or not the element Cj satisfies the above formula (1) (S1907). If the above formula (1) is satisfied (S1907: Yes), the processing moves to S1911.

Conversely, if the above formula (1) is not satisfied (S1907: No), the determining unit 304 determines whether or not the element Cj satisfies the above formula (2) (S1908). If the above formula (2) is satisfied (S1908: Yes), the processing moves to S1911.

Conversely, if the above formula (2) is not satisfied (S1908: No), the determining unit 304 determines whether or not the element Cj satisfies the above formula (3) (S1909). If the above formula (3) is not satisfied (S1908: No), the determining unit 304 determines that the element Cj belongs to the bounding box Bi (S1910).

Conversely, if the above formula (3) is satisfied (S1909: Yes), the determining unit 304 increments the "i" of the bounding box Bi (S1911), and then determines whether or not "i" is larger than "n" (S1912).

If "i" is equal to or less than "n" (S1912: No), the processing returns to S1906. Conversely, if "i" exceeds "n" (S1912: Yes), the determining unit 304 determines that the element Cj belongs to the bounding box B0 (S1913).

The determining unit 304 then increments the "j" of the element Cj (S1914), and then determines whether or not "j" is larger than "m" (S1915). If "j" is equal to or less than "m" (S1915: No), the processing returns to S1904. Conversely, if "j" exceeds "m" (S1915: Yes), the processing moves to S1807 of FIG. 18.

As a result, the bounding box Bi to which the elements Cj divided from the bounding box B0 that surrounds the object may be uniquely specified.

The following is a detailed explanation of the generating process conducted in S1807 in FIG. 18.

Figure 20:
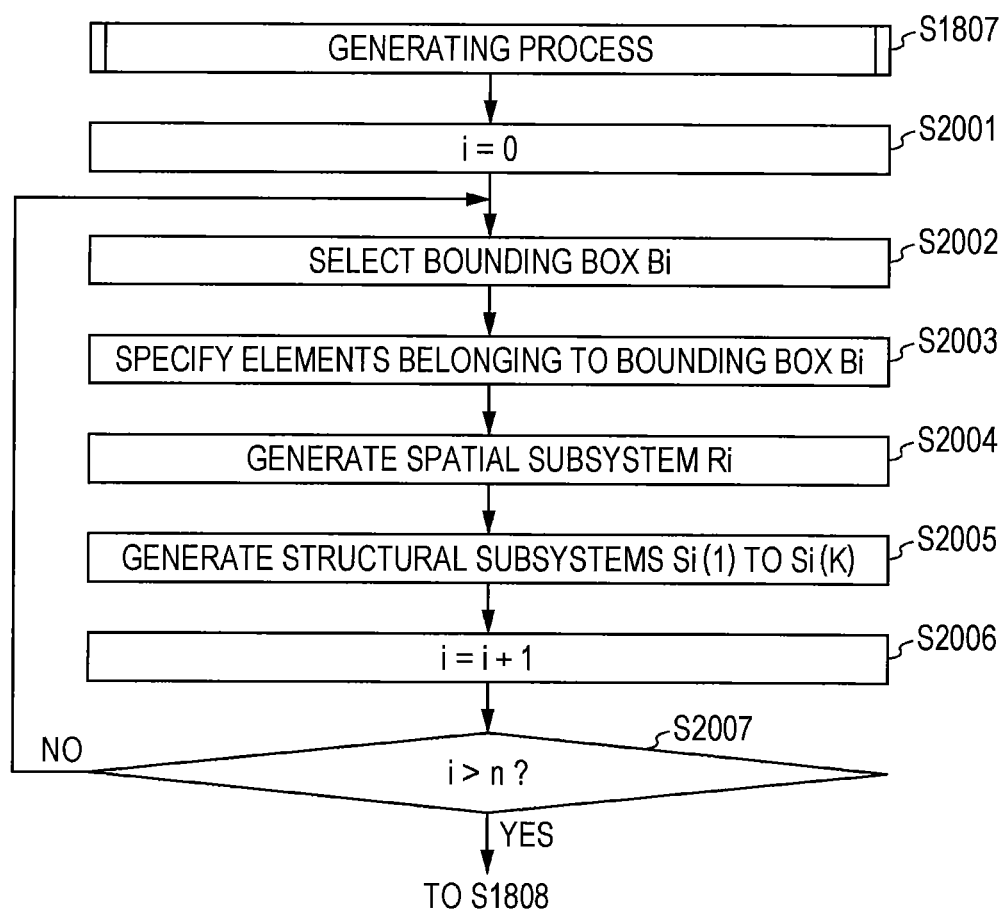
FIG. 20 is a flowchart of an example of detailed generating process.

FIG. 20 is a flowchart of an example of a detailed generating process. In FIG. 20, the generating unit 305 assigns "0" to the "i" of the bounding box Bi so that "i=0" (S2001), and selects the bounding box Bi from the bounding boxes B1 to Bn (S2002).

The generating unit 305 specifies elements belonging to the bounding box Bi (S2003). The generating unit 305 then generates a spatial subsystem Ri by merging the elements belonging to the bounding box Bi (S2004).

The generating unit 305 then generates structural subsystems Si(1) to Si(K) that represent planes that form the spatial subsystem Ri (S2005). The generating unit 305 then increments the "i" of the bounding box Bi (S2006), and then determines whether or not "i" is larger than "n" (S2007).

If "i" is equal to or less than "n" (S2007: No), the processing returns to S2002. Conversely, if "i" exceeds "n" (S2007: Yes), the processing moves to S1808 of FIG. 18. As a result, the spatial subsystem Ri that represents the space in which the assembly Abi exists, and the structural subsystems Si(1) to Si(K) that represent walls that surround the space in which the assembly Abi exists, are generated.

The following is a detailed explanation of the searching process conducted in S1808 in FIG. 18.

Figure 21:
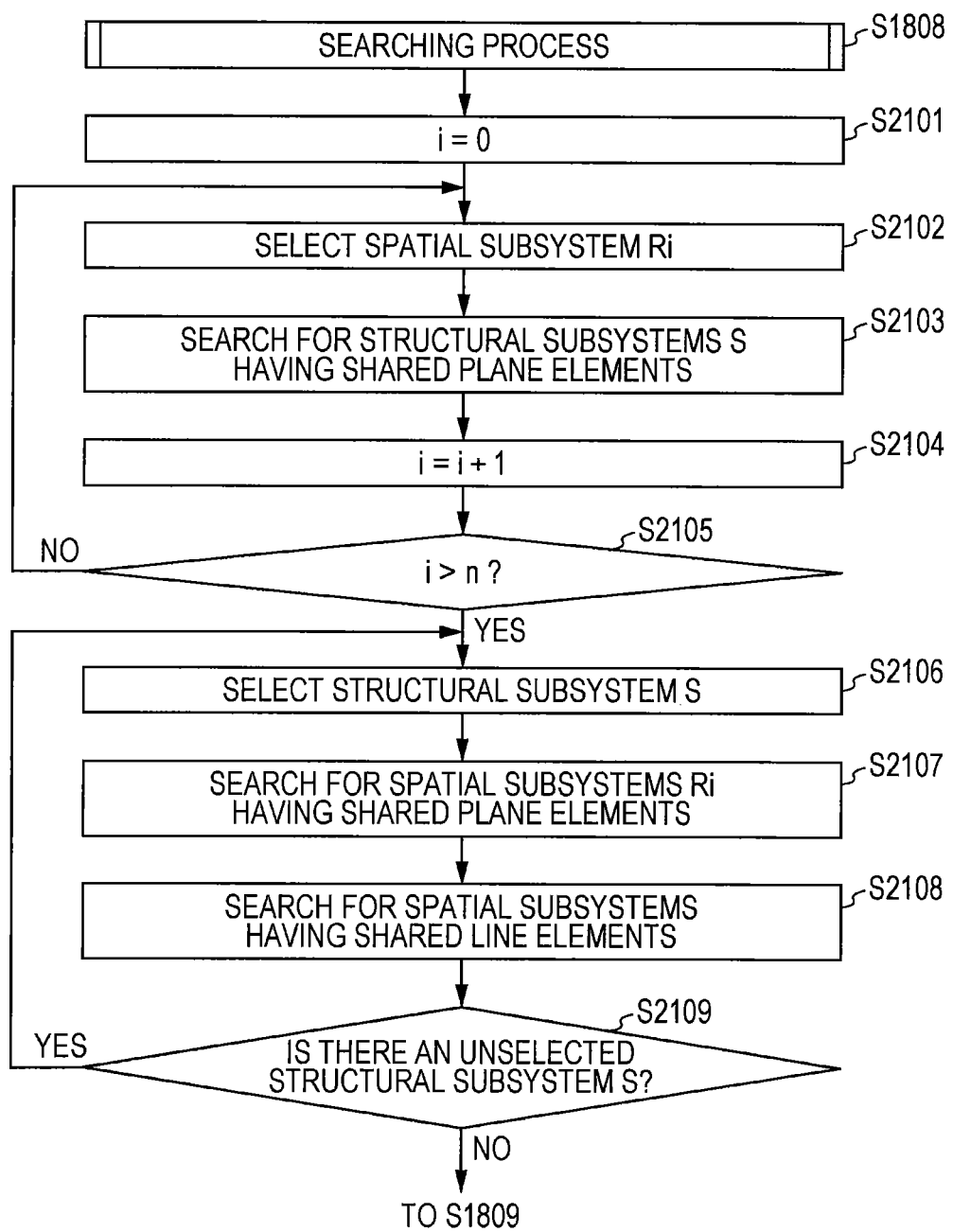
FIG. 21 is a flowchart of an example of detailed searching process.

FIG. 21 is a flowchart of an example of a detailed searching process. In FIG. 21, the searching unit 306 first assigns "0" to "i" of the spatial subsystem Ri so that "i=0" (S2101), and selects the spatial subsystem Ri from among the spatial subsystems R0 to Rn (S2102).

The searching unit 306 then searches for a structural subsystem S having a plane element shared with the spatial subsystem Ri among the generated groups of models (S2103). The searching unit 306 increments the "i" of the spatial subsystem Ri (S2104), and then determines whether or not "i" is larger than "n" (S2105).

If "i" is equal to or less than "n" (S2105: No), the processing returns to S2102. Conversely, if "i" exceeds "n" (S2105: Yes), the searching unit 306 selects the structural subsystem S from the generated structural subsystem groups (S2106).

The searching unit 306 then searches for the spatial subsystem Ri having a plane element shared with the structural subsystem S among the spatial subsystems R0 to Rn (S2107). The searching unit 306 searches for structural subsystems having a shared line element with the structural subsystem S in the group of generated structural subsystems (S2108).

The searching unit 306 then determines whether or not there is an unselected structural subsystem S that is not selected from the generated structural subsystem group (S2109). If an unselected structural subsystem S exists (S2109: Yes), the processing returns to S2106. Conversely, if there is no unselected structural subsystem S (S2109: No), the processing moves to S1809 in FIG. 18.

As a result, adjacency relationships may be specified between the subsystems that are used for building a network to indicate the coupling of acoustic vibration energies. In S2107, the searching for the spatial subsystem Ri having a plane element shared with the structural subsystem S may also use the searching results from S2103.

The following is a detailed explanation of the setting process conducted in S1809 in FIG. 18.

Figure 22:
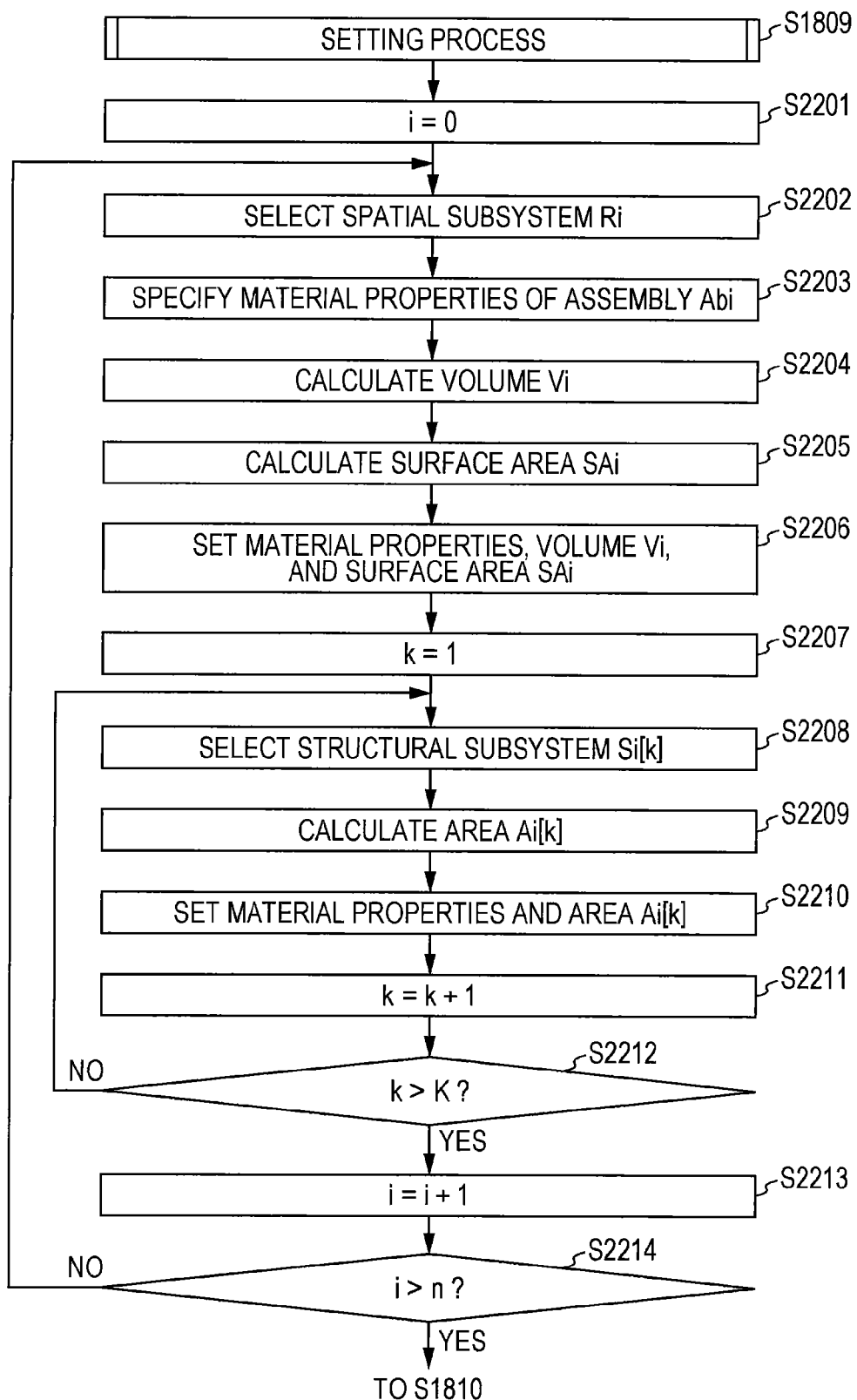
FIG. 22 is a flowchart of an example of detailed setting process.

FIG. 22 is a flowchart of an example of a detailed setting process. In FIG. 22, the setting unit 308 first assigns "0" to "i" of the spatial subsystem Ri so that "i=0" (S2201), and selects the spatial subsystem Ri from among the spatial subsystems R0 to Rn (S2202).

The setting unit 308 then specifies material properties of the assembly Abi corresponding to the spatial subsystem Ri based on the design information acquired in S1802 in FIG. 18 (S2203). The calculating unit 307 then calculates the volume Vi of the spatial subsystem Ri (S2204).

The calculating unit 307 then calculates the surface area SAi of the spatial subsystem Ri (S2205). The setting unit 308 then sets the material properties of the assembly Abi, the volume Vi, and the surface area SAi for the spatial subsystem Ri (S2206).

The setting unit 308 then assigns "1" to "k" of the structural subsystem Si[k] so that "k=1" (S2207), and selects the structural subsystem Si[k] from the structural subsystems Si[1] to Si[K] (S2208).

The calculating unit 307 then calculates an area Ai(k) of the structural subsystem Si(k) (S2209). The setting unit 308 then sets the material properties of the assembly Abi and the area Ai(k) for the structural subsystem Si(k) (S2210).

The setting unit 308 then increments the "k" of the structural subsystem Si[k] (S2211), and determines whether or not "k" exceeds "K" (S2212). If "k" is equal to or less than "K" (S2212: No), the processing returns to S2208.

Conversely, if "k" exceeds "K" (S2212: Yes), the setting unit 308 increments "i" of the spatial subsystem Ri (S2213) and determines whether or not "i" exceeds "n" (S2214).

If "i" is equal to or less than "n" (S2214: No), the processing returns to S2202. Conversely, if "i" exceeds "n" (S2214: Yes), the processing moves to S1810 of FIG. 18. As a result, the properties of each subsystem may be set.

As described above, element groups belonging to the bounding boxes Bi that surrounds the assemblies Abi may be specified by the analytical support device 100 according to the embodiment from the elements C1 to Cm that are divided from the bounding box B0 that surrounds the object. The analytical support device 100 may also generate spatial subsystems Ri that represent sound fields in which the assemblies Abi exist based on element groups belonging to the bounding boxes Bi.

As a result, a spatial subsystem Ri that is divided by locations with a high probability of having walls and incorporating assemblies Abi included in the object may be generated, and thus efficiency may be improved in the work to create analytical models suited for acoustic vibration analysis using the SEA method. Moreover, by using rectangular solids as solid figures that surround the object and the assemblies Abi, a processing load on the analytical support device 100 may be reduced in comparison to using circular or polygon figures and the like.

Moreover, by selecting components having a certain size in the object as the assemblies Abi, the generation of spatial subsystems Ri or structural subsystems Si(k) that are too large or too small in relation to the object may be avoided thereby inhibiting a loss of accuracy in the analysis.

The analytical support device 100 may also generate structural subsystems Si[1] to Si[K] that represent plates surrounding sound fields in which the assemblies Abi exist based on element groups belonging to the bounding boxes Bi.

The analytical support device 100 may also set material properties of the assemblies Abi in the spatial subsystems Ri that represent the sound fields in which the assemblies Abi exist. Specifically, the analytical support device 100 is able to set the material properties of the material with the largest volume among the materials included in the assemblies Abi for the spatial subsystems Ri. As a result, material properties that become acoustic conditions of the acoustic vibration analysis may be set for the spatial subsystems Ri to improve the efficiency of the analytical model creation work.

The analytical support device 100 may also set material properties of the assemblies Abi in the structural subsystems Si[k] that represent plates surrounding the sound fields in which the assemblies Abi exist. As a result, material properties that become acoustic conditions of the acoustic vibration analysis may be setted for the structural subsystems Si[k] to improve the efficiency of the analytical model creation work.

The analytical support device 100 may also calculate volumes Vi of the spatial subsystems Ri and set the calculated volumes Vi for the spatial subsystems Ri. As a result, volumes Vi that become analytical conditions of the acoustic vibration analysis may be setted for the spatial subsystems Ri to improve the efficiency of the analytical model creation work.

The analytical support device 100 may also calculate surface areas SAi of the spatial subsystems Ri and set the calculated surface areas SAi for the spatial subsystems Ri. As a result, surface areas SAi that become analytical conditions of the acoustic vibration analysis may be setted for the spatial subsystems Ri to improve the efficiency of the analytical model creation work.

The analytical support device 100 may also calculate areas Ai (k) of the structural subsystems Si[k] and set the calculated areas Ai(k) for the structural subsystems Si[k]. As a result, areas Ai(k) that become analytical conditions of the acoustic vibration analysis may be setted for the structural subsystems Si[k] to improve the efficiency of the analytical model work.

The analytical support device 100 may also search for a combination of adjacent spatial subsystems Ri and structural subsystems S among the groups of generated models. As a result, adjacency relationships may be specified between the subsystems so that networks to indicate the coupling of acoustic vibration energies may be built.

The analytical support device 100 may also search for combinations of adjacent first and second structural subsystems among the groups of generated models. As a result, adjacency relationships may be specified between the subsystems so that networks to indicate the coupling of acoustic vibration energies may be built.

As a result of the above, efficiency of work for creating an analytical model related to an object may be improved by using the analytical support program, the analytical support method, and the analytical support device.

The analytical support method described in the present embodiment may be realized by executing a program prepared in advance using a computer such as a personal computer or a workstation. Furthermore, the analytical support program may be recorded on a memory, a hard disc, or another type of computer-readable recording medium so that the analytical support program may be executed by being read from the recording medium by the computer. The analytical support program may also be distributed through a communication network such as the internet and the like.

According to an embodiment of the present disclosure, efficiency of work to create an analytical model may be improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory, computer readable storage medium storing a program that causes a computer to conduct a processing, the processing comprising:
   creating a solid figure surrounding an object and a solid figure surrounding a plurality of components of a group of components included in the object, based on design information related to the object;
   determining elements belonging to the solid figure surrounding the plurality of components from a plurality of elements partitioned and divided from the created solid figure surrounding the object;
   generating a spatial model that represents a space in which the plurality of components exist, based on the determined elements that belong to the solid figure surrounding the plurality of components; and
   outputting a result of the generating.

2. The non-transitory, computer readable storage medium according to claim 1, wherein the processing further comprises generating a plate model that represents a plate surrounding a space in which the plurality of components exist, based on elements that belong to the solid figure that surrounds the plurality of components.

3. The non-transitory, computer readable storage medium according to claim 2, wherein the processing further comprises generating a spatial model that represents a space different from a space in which the plurality of components exist, based on remaining elements different from the elements belonging to the solid figure surrounding the plurality of components among the plurality of elements.

4. The non-transitory, computer readable storage medium according to claim 3, wherein the processing further comprises generating a plate model that represents a plate surrounding the space different from the space in which the plurality of components exist, based on the remaining elements.

5. The non-transitory, computer readable storage medium according to claim 4, wherein the processing further comprises setting material properties of the plurality of components for the spatial model that represents the space in which the plurality of components exist, and outputting the spatial model for which the material properties of the plurality of components are set.

6. The non-transitory, computer readable storage medium according to claim 5, wherein the processing further comprises setting material properties of the plurality of components for a plate model that represents a plate surrounding a space in which the plurality of components exist, and outputting the plate model for which the material properties of the plurality of components are set.

7. The non-transitory, computer readable storage medium according to claim 6, wherein the processing further comprises setting material properties of the object for a spatial model that represents a space different from the space in which the plurality of components exist; and outputting the spatial model for which the material properties of the object are set.

8. The non-transitory, computer readable storage medium according to claim 7, wherein the processing further comprises setting material properties of the object for a plate model that represents a plate surrounding a space different from the space in which the plurality of components exist, and outputting the plate model for which the material properties of the object are set.

9. The non-transitory, computer readable storage medium according to claim 8, wherein the processing further comprises calculating a volume of the spatial model, setting the calculated volume for the spatial model, and outputting the spatial model for which the volume is set.

10. The non-transitory, computer readable storage medium according to claim 9, wherein the processing further comprises calculating a surface area of the spatial model, setting the calculated surface area for the spatial model, and outputting the spatial model for which the surface area is set.

11. The non-transitory, computer readable storage medium according to claim 10, wherein the processing further comprises calculating an area of the plate model, setting the calculated area for the plate model, and outputting the plate model for which the area is set.

12. The non-transitory, computer readable storage medium according to claim 11, wherein the processing further comprises searching for a combination of a spatial model and a plate model that are adjacent to each other from among the result of the generating, and outputting the result of the searching.

13. The non-transitory, computer readable storage medium according to claim 12, wherein the processing further comprises the searching for the combination includes searching for a combination of a spatial model and a plate model having a shared plate element, from among the result of the generating.

14. The non-transitory, computer readable storage medium according to claim 13, wherein the processing further comprises searching for a combination of a first plate model and a second plate model that are adjacent to each other from among the result of the generating, and outputting the result of the searching.

15. The non-transitory, computer readable storage medium according to claim 14, wherein the searching for the combination includes searching for a combination of a first plate model and a second plate model having a shared line element from among the result of the generating.

16. An method of controlling an analytical support device comprising:
creating a solid figure surrounding an object and a solid figure surrounding a plurality of components of a group of components included in the object, based on design information related to the object by the analytical support device;
determining, by a processor, elements belonging to the solid figure surrounding the plurality of components from a plurality of elements partitioned and divided from the created solid figure surrounding the object;
generating a spatial model that represents a space in which the plurality of components exist, based on the determined elements that belong to the solid figure surrounding the plurality of components; and
outputting a result of the generating.

17. An analytical support device comprising:
a memory; and
a processor coupled to the memory and configured to:
create a solid figure surrounding an object and a solid figure surrounding a plurality of components of a group of components included in the object, based on design information related to the object,
determine elements belonging to the solid figure surrounding the plurality of components from a plurality of elements partitioned and divided from the created solid figure surrounding the object,
generate a spatial model that represents a space in which the plurality of components exist, based on the determined elements that belong to the solid figure surrounding the plurality of components, and
output the spatial model.

* * * * *